United States Patent [19]

Hayashi et al.

[11] Patent Number: 6,030,688

[45] Date of Patent: Feb. 29, 2000

[54] RECTANGULAR PARALLELOPIPEDIC LEPIDOCROCITE PARTICLES AND MAGNETIC RECORDING MEDIUM CONTAINING THE PARTICLES

[75] Inventors: Kazuyuki Hayashi; Hiroko Morii; Yoshiro Okuda; Keisuke Iwasaki, all of Hiroshima, Japan

[73] Assignee: Toda Kogyo Cororation, Japan

[21] Appl. No.: 08/907,485

[22] Filed: Aug. 8, 1997

[30] Foreign Application Priority Data

Aug. 9, 1996 [JP] Japan ................................. 8-227545
Oct. 24, 1996 [JP] Japan ................................. 8-301214

[51] Int. Cl.⁷ .................................................. G11B 5/708
[52] U.S. Cl. ........................ 428/141; 428/216; 428/329; 428/403; 428/404; 428/694 BS; 428/900; 106/456; 252/62.56; 423/632; 423/634
[58] Field of Search ........................ 106/456; 252/62.56; 423/632, 634; 428/694 BS, 900, 329, 403, 404, 216, 141

[56] References Cited

U.S. PATENT DOCUMENTS

| | | | |
|---|---|---|---|
| 3,382,174 | 5/1968 | Hund ................................... | 252/62.57 |
| 4,729,846 | 3/1988 | Matsui et al. ......................... | 252/62.56 |
| 5,503,911 | 4/1996 | Aoki et al. ............................. | 428/213 |
| 5,541,008 | 7/1996 | Hatawaka et al. .................. | 428/694 B |
| 5,587,232 | 12/1996 | Hayashi et al. ........................ | 428/323 |
| 5,686,378 | 11/1997 | Katamoto .............................. | 502/338 |

FOREIGN PATENT DOCUMENTS 0 583 621 A1  2/1994  European Pat. Off. .
0 692 308 A1  1/1996  European Pat. Off. .

OTHER PUBLICATIONS

6001 Chemical Abstracts 114 (1991) Mar. 25, No. 12 105209a Manufacture of lepidocrocite powder.

*Primary Examiner*—Steven A. Resan
*Attorney, Agent, or Firm*—Nixon & Vanderhye

[57] ABSTRACT

Rectangular parallelopipedic lepidocrocite particles of the present invention have a minor axial diameter of 0.045 to 0.5 $\mu$m, a major axial diameter of 0.05 to 1.0 $\mu$m, and a thickness of 0.001 to 0.3 $\mu$m, which are individual. Such rectangular parallelopipedic lepidocrocite particles according to the present invention are firstly used as a coloring pigment for paints, resin moldings, printing ink, road asphalt, cosmetics, etc., and secondly used as a non-magnetic material for non-magnetic undercoat layers which are formed on non-magnetic substrates which constitute a substrate for magnetic recording media, and which have an excellent surface smoothness and a high strength.

29 Claims, 5 Drawing Sheets

(×30000)

(×30000)

(×30000)

(×30000)

(×30000)

(×30000)

RECTANGULAR PARALLELOPIPEDIC LEPIDOCROCITE PARTICLES AND MAGNETIC RECORDING MEDIUM CONTAINING THE PARTICLES

BACKGROUND OF THE INVENTION

The present invention relates to rectangular parallelopipedic lepidocrocite particles and a process for producing the same, and more particularly, to lepidocrocite particles which have a rectangular parallelopipedic shape and which are individual, and a process for producing such lepidocrocite particles.

The rectangular parallelopipedic lepidocrocite particles according to the present invention are firstly used as a coloring pigment for paints, resin moldings, printing ink, road asphalt, cosmetics, etc., and secondly used as a non-magnetic material for non-magnetic undercoat layers, more particularly, as a non-magnetic material for non-magnetic undercoat layers which are formed on non-magnetic substrates which constitute a substrate for magnetic recording media, and which have an excellent surface smoothness and a high strength.

Firstly, a pigment as a use of lepidocrocite particles will first be explained.

Recently, orange pigments dispersed into vehicles or resins have been widely used as coloring pigments for paints, resin moldings, printing ink, road asphalt, cosmetics, etc. An orange color is a color representing warning in traffic rules, so that orange pigments have come into wide use as coloring pigments for road asphalt and traffic paints. The orange color here is referred to a color having a hue in the 'L* a* b* color system' in which the a* value is in the range of 15 to 50 and the b* value is in the range of 20 to 55.

As orange pigments, organic pigments such as Sudan I, permanent orange and lithol fast orange, and inorganic pigments such as orange chrome ($PbCrO_4.PbO$) and chrome vermilion ($PbCrO_4.PbMoO_4.PbSO_4$) has been put to practical use and come to wide use.

However, the organic pigments are generally expensive. On the other hand, the inorganic pigments are toxic because of heavy metals contained therein, such as lead and chrome. Therefore, organic pigments which are inexpensive and nontoxic are strongly demanded.

Iron oxide particles, ferric oxide hydroxide particles, etc. have an excellent environment stability such as good stability to oxidation in the air and nontoxicity, and they also have various hues. Consequently, the ferric oxide hydroxide particles have conventionally been widely used as a coloring pigment for paints, resin moldings, printing ink, road asphalt, cosmetics, etc.

There are various kinds of inexpensive and nontoxic iron oxide particles. Among them, those which are used as orange pigments are a mixture of yellow goethite ($\alpha$-FeOOH) particles and red hematite ($\alpha$-$Fe_2O_3$), and lepidocrocite ($\gamma$-FeOOH) particles.

From the point of view of enhancement of working capacity and improvement of physical properties of a coating film, the improvement of various properties of the particles are strongly demanded.

To state this concretely, the enhancement of the tinting strength and the hiding power of a pigment as well as a good dispersibility of the pigment into a vehicle and a resin is strongly demanded.

Secondly, a non-magnetic material for non-magnetic undercoat layers of magnetic recording media as a use of lepidocrocite particles will now be explained.

With a development of miniaturized and lightweight video or audio magnetic recording and reproducing apparatuses for long-time recording, magnetic recording media such as a magnetic tape and magnetic disk have been strongly required to have a higher performance, namely, a higher recording density.

Especially, video tapes have been increasingly required to have a higher recording density, and the frequencies of carrier signals recorded in recent video tapes are higher than those recorded in conventional video tapes. In other words, the signals in the short wave-length region have come to be used, and as a result, the magnetization depth from the surface of a magnetic tape has come to be remarkably small.

In order to enhance the recording density, it is necessary to maintain high output characteristics and to reduce noise, especially to enhance the S/N ratio even with respect to signals having a short wavelength. For this purpose, in a magnetic recording medium composed of a substrate and a magnetic recording layer formed on the substrate, it have been conducted to reduce the thickness of the magnetic recording layer, as described in the following literature.

For example, *Development of Magnetic Materials and Technique for High Dispersion of Magnetic Powder*, published by Sogo Gijutsu Center Co., Ltd. (1982) states on page 312, ". . . the conditions for high-density recording in a coated-type tape are that the noise level is low with respect to signals having a short wavelength while the high output characteristics are maintained. To satisfy these conditions, it is necessary that the tape has large coercive force Hc and residual magnetization Br, . . . and the coating film has a smaller thickness".

Development of a thinner film for a magnetic recording layer has caused some problems.

It is necessary to make a magnetic recording layer smooth and to eliminate the non-uniformity of thickness. As well known, in order to obtain a smooth magnetic recording layer having a uniform thickness, the surface of the substrate must also be smooth. This fact is described on pages 180 and 181 of *Materials for Synthetic Technology-Causes of Friction and Abrasion of Magnetic Tape and Head Running System and Measures for Solving the Problem* (hereinunder referred to as "*Materials for Synthetic Technology*") (1987), published by the publishing department of Technology Information Center, ". . . the surface roughness of a hardened magnetic layer depends on the surface roughness of the substrate (back surface roughness) so largely as to be approximately proportional, . . . since the magnetic layer is formed on the substrate, the more smooth the surface of the substrate is, the more uniform and larger head output is obtained and the more the S/N ratio is improved".

Further, there has been caused a problem in the strength of a substrate film or the like with a tendency to reduction in the thickness of a non-magnetic substrate such as a base film which has conventionally been used as a substrate for a magnetic recording layer. This fact is described, for example, on page 77 of the above-described *Development of Magnetic Materials and Technique for High Dispersion of Magnetic Powder*, ". . . Higher recording density is a large problem assigned to the present magnetic tape. This is important in order to shorten the length of the tape so as to miniaturize a cassette and to enable long-time recording. For this purpose, it is necessary to reduce the thickness of a substrate . . . With the tendency to reduction in the film thickness, the stiffness of the tape also reduces to such an extent as to make smooth travel in a recorder difficult. Therefore, improvement of the stiffness of a video tape both in the machine direction and in the transverse direction is now strongly demanded".

As described above, with a tendency to reduction in the thickness of a magnetic recording layer, it is strongly required that the substrate for forming the magnetic recording layer has as smooth a surface as possible, and a strength high enough to compensate for a reduction in the strength of a non-magnetic substrate such as a base film which is sacrificed by a tendency to reduction in the thickness.

Various efforts have been made to improve a substrate for a magnetic recording layer. For example, a substrate composed of a non-magnetic substrate such as a base film and at least one undercoat layer (hereinunder referred to as "non-magnetic undercoat layer") obtained by dispersing non-magnetic particles into a binder, which is formed on the non-magnetic substrate, has already been put to practical use (Japanese Patent Application Laid-Open (KOKAI) Nos. 63-187418 (1988) and 4-167225 (1992)).

Japanese Patent Application Laid-Open (KOKAI) No. 63-187418 (1988) proposes a magnetic recording medium comprising a non-magnetic substrate, at least one undercoat layer produced by dispersing non-magnetic particles in a binder, and a magnetic layer produced by dispersing ferromagnetic particles in a binder, wherein the ferromagnetic particles are ferromagnetic iron oxide particles, ferromagnetic cobalt-modified iron oxide particles or ferromagnetic alloy particles, the average major axial diameter of the ferromagnetic particles measured through a transmission electron microscope is less than 0.30 $\mu$m and the crystalline size thereof by X-ray diffraction is less than 300 Å.

Japanese Patent Application Laid-Open (KOKAI) No. 4-167225 (1992) proposes a magnetic recording medium produced by forming a magnetic layer on the surface of a non-magnetic substrate through an undercoat layer which contains acicular particles having an aspect ratio of more than 3.0 in a resin binder hardened when irradiated with an electromagnetic wave such as radioactive rays and ultraviolet rays.

Although a substrate having as smooth a surface as possible and a high strength is now in the strongest demand with a tendency to reduction in thickness of not only a magnetic recording layer but also a non-magnetic substrate, no substrate ever obtained has such properties.

The non-magnetic undercoat layer described in Japanese Patent Application Laid-Open (KOKAI) No. 63-187418 (1988) is produced by dispersing non-magnetic particles such as $\alpha$-$Fe_2O_3$ ($\alpha$-iron oxide) and $\alpha$-$Al_2O_3$ ($\alpha$-alumina) into a binder. Since the shapes of the non-magnetic particles are acicular or granular, it is impossible to say that the acicular or granular non-magnetic particles can adequately improve the surface smoothness and the strength of the non-magnetic substrate.

The non-magnetic undercoat layer described in Japanese Patent Application Laid-Open (KOKAI) No. 4-167225 (1992) is produced by dispersing acicular $\alpha$-FeOOH particles in a binder, but since they have also an acicular shape, it is impossible to say that the acicular $\alpha$-FeOOH particles can adequately improve the surface smoothness and the strength of the non-magnetic substrate.

Examples of the conventional processes for producing lepidocrocite particles are (1) a process for producing lepidocrocite particles by passing an oxygen-containing gas, at a temperature of not more than 15° C., into a suspension containing a ferrous hydroxide and having a pH of 7.0 to 9.0 which is obtained by reacting a ferrous salt solution and an alkali solution (Japanese Patent Publication No. 33-6734 (1958)), (2) a process for producing lepidocrocite particles by passing an oxygen-containing gas, at a temperature of 5 to 15° C., into a suspension containing a ferrous hydroxide and having a pH of 5.5 to 7.0 which is obtained by reacting an aqueous ferrous sulfate and an aqueous alkali solution (Japanese Patent Application Laid-Open (KOKAI) No. 55-3323 (1980)), (3) a process for producing lepidocrocite particles by passing an oxygen-containing gas into a suspension containing a ferrous hydroxide and having a pH of less than 5.5 which is obtained by reacting an aqueous ferrous sulfate and an aqueous sodium hydroxide, in the presence of disodium hydrogenphosphate at a temperature of about 45° C. (Japanese Patent Application Laid-Open (KOKAI) No. 62-108738 (1987)), and (4) a process for producing lepidocrocite particles by passing an oxygen-containing gas into a suspension containing a ferrous hydroxide and having a pH of about 10 which is obtained by reacting an aqueous ferrous sulfate and an aqueous alkali hydroxide, in the presence of a water-soluble phosphorus compound or arsenic compound to produce lepidocrocite seed crystals, and growing the lepidocrocite seed crystals in a temperature range of 55 to 100° C. (Japanese Patent Publication (KOKOKU) 43-2214 (1968)).

Although a process for industrially and economically producing orange pigments which have excellent dispersibility, tinting strength and hiding power, and which are inexpensive and nontoxic is now in the strongest demand, the orange pigments composed of the above-described iron oxide particles cannot be said to adequately meet such demands.

Mixed particles of yellow goethite ($\alpha$-FeOOH) particles and red hematite ($\gamma$-$Fe_2O_3$) particles are disadvantageous in that since different kinds of particles are mixed, the dispersibility of the mixed particles in a vehicle or a resin at the time of producing a coating material or the like is not sufficient, and in that after dispersion, segregation in the coating material or the like is likely to be caused.

When lepidocrocite particles are produced, acicular particles are likely to agglomerate due to a production reaction. The dispersibility of such lepidocrocite particles into a vehicle or a resin is therefore not sufficient. In addition, the tinting strength and the hiding power are not sufficient due to the particle form.

This fact is explained in the following.

When lepidocrocite particles are produced, an aqueous ferrous chloride solution or an aqueous ferrous sulfate solution is generally used as an iron material.

If an aqueous ferrous chloride solution is used as an iron material, a reaction vessel or the like is corroded, which is industrially disadvantageous.

On the other hand, use of an aqueous ferrous sulfate solution as an iron material is free from the corrosion of a reaction vessel, but the particles produced by any of the above-described methods (1) to (3) are acicular particles. In addition, particles other than lepidocrocite particles are likely to mix with the lepidocrocite particles due to the production reaction.

When the pH of the solution in the reaction process is in the acidic range, acicular goethite particles mix with lepidocrocite particles, and when the pH of the solution in the reaction process is in the alkali range, granular magnetite particle mix with lepidocrocite particles.

If the pH of the solution in the reaction process is as low as less than 7, when the precipitate containing an alkali metal and an $SO_4$ which are produced at the same time with the production of lepidocrocite particles, that is, a slightly soluble sulfur-containing iron salt represented by $RFe_3(SO_4)_2(OH)_6$ (where R represents $K^+$, $Na^+$ or $NH^+$) is contained in particles and/or is present between particles. Since the slightly soluble sulfur-containing iron salt is difficult to remove and remains crosslinked between particles when it is washed with water, so that agglomerates are likely to be caused.

When lepidocrocite particles are produced at a temperature of not more than 15° C., cooling or the like is necessitated, which is industrially disadvantageous.

In case of the above-described process (4), the reaction at as high a temperature as 55 to 100° C. at the time of growing seed crystals can be conducted if a water-soluble phosphorus compound or arsenic compound is present at the time of producing the seed crystals. The form of the seed crystals is transformed from a non-isometric system to an isometric system so as to obtain lepidocrocite particles having an isometric system, i.e. granular lepidocrocite particles.

In the lepidocrocite particles produced by these methods, however, since the lepidocrocite particles are granular, the tinting strength and the hiding power are insufficient.

In the production of seed crystals, the lepidocrocite particles have an acicular shape and granular magnetite particles mix with the lepidocrocite particles, as will be shown in later-described comparative examples.

Accordingly, the present invention is aimed at industrially and economically producing lepidocrocite particles which are excellent in dispersibility, tinting strength and hiding power.

The present invention is also aimed at producing non-magnetic particles used for a non-magnetic undercoat layer formed on a non-magnetic substrate so as to obtain a substrate having an excellent surface smoothness and a high strength.

As a result of studies undertaken by the present inventors, it has been found that by mixing an aqueous ferrous sulfate, an aqueous alkali hydroxide and 0.1 to 5.0 mol % of at least one selected from the group consisting of a phosphorus compound and a citric compound based on Fe at a temperature of 25 to 55° C. to produce a suspension containing an iron hydroxide and having a pH of 7 to 9, and oxidizing the iron hydroxide by passing an oxygen-containing gas into the suspension while adjusting the pH value to 7 to 9 at a temperature of 25 to 55° C., the obtained rectangular parallelopipedic lepidocrocite particles having a minor axial diameter of 0.045 to 0.5 $\mu$m, a major axial diameter of 0.05 to 1.0 $\mu$m, a thickness of 0.001 to 0.3 $\mu$m and a geometrical standard deviation of said major axial diameter of preferably not more than 1.70, more preferably not more than 1.40, are individual and are excellent in dispersibility, tinting strength and hiding power. The present invention has been achieved on the basis of this finding.

SUMMARY OF THE INVENTION

It is an object of the present invention to provide lepidocrocite particles which are individual and are excellent in dispersibility, tinting strength and hiding power, and a process for industrially and economically producing such lepidocrocite particles.

It is another object of the present invention to provide non-magnetic particles used for a non-magnetic undercoat layer formed on a non-magnetic substrate so as to obtain a substrate having an excellent surface smoothness and a high strength.

It is still another object of the present invention to provide a coloring pigment comprising such lepidocrocite particles.

It is a further object of the present invention to provide a substrate for a magnetic recording medium having a non-magnetic undercoat layer containing such lepidocrocite particles.

It is a still further object of the present invention to provide a magnetic recording medium having a non-magnetic undercoat layer containing such lepidocrocite particles.

To accomplish the aim, in a first aspect of the present invention, there are provided rectangular parallelopipedic lepidocrocite particles having a minor axial diameter of 0.045 to 0.5 $\mu$m, a major axial diameter of 0.05 to 1.0 $\mu$m, and a thickness of 0.001 to 0.3 $\mu$m.

In a second aspect of the present invention, there is provided rectangular parallelopipedic lepidocrocite particles having a minor axial diameter of 0.045 to 0.5 $\mu$m, a major axial diameter of 0.05 to 1.0 $\mu$m, and a thickness of 0.001 to 0.3 $\mu$m, and having on the surface thereof a coating layer comprising at least one selected from the group consisting of hydroxides of aluminum, oxides of aluminum, hydroxides of silicon and oxides of silicon.

In a third aspect of the present invention, there is provided rectangular parallelopipedic lepidocrocite particles having a minor axial diameter of 0.045 to 0.5 $\mu$m, a major axial diameter of 0.05 to 1.0 $\mu$m and a thickness of 0.001 to 0.3 $\mu$m, and having a geometrical standard deviation of said major axial diameter of not more than 1.40.

In a fourth aspect of the present invention, there is provided rectangular parallelopipedic lepidocrocite particles having a minor axial diameter of 0.045 to 0.5 $\mu$m, a major axial diameter of 0.05 to 1.0 $\mu$m, a thickness of 0.001 to 0.3 $\mu$m and a geometrical standard deviation of said major axial diameter of not more than 1.40, and having on the surface thereof a coating layer comprising at least one selected from the group consisting of hydroxides of aluminum, oxides of aluminum, hydroxides of silicon and oxides of silicon.

In a fifth aspect of the present invention, there is provided a pigment comprising rectangular parallelopipedic lepidocrocite particles as defined in any one of the first to fourth aspects.

In a sixth aspect of the present invention, there is provided a paint comprising 0.1 too 200 parts by weight of a pigment as defined in the fifth aspect and 100 parts by weight of a paint base material.

In a seventh aspect of the present invention, there is provided a rubber or resin composition comprising: 0.1 to 10.0 parts by weight of a pigment as defined in the fifth aspect based on 100 parts by weight of said composition; and 90 to 99.9 parts by weight of a rubber and a thermoplastic resin based on 100 parts by weight of said composition.

In an eighth aspect of the present invention, there is provided a substrate for magnetic recording media comprising: a non-magnetic substrate; and a non-magnetic undercoat layer comprising a coating composition comprising non-magnetic particles comprising rectangular parallelopipedic lepidocrocite particles as defined in any one of the first to fourth aspects, and a resin binder, which is formed on said non-magnetic base.

In a ninth aspect of the present invention, there is provided a magnetic recording medium comprising: a non-magnetic substrate; a non-magnetic undercoat layer comprising a coating composition comprising non-magnetic particles comprising rectangular parallelopipedic lepidocrocite particles as defined in any one of the first to fourth aspects, and a resin binder, which is formed on said non-magnetic substrate; and a magnetic recording layer formed on said non-magnetic undercoat layer.

In a tenth aspect of the present invention, there is provided a process for producing rectangular parallelopipedic lepidocrocite particles as defined in the first aspect, comprising the steps of: mixing an aqueous ferrous sulfate, an aqueous alkali hydroxide and 0.1 to 5.0 mol % of at least one selected from the group consisting of a phosphorus compound and a citric compound based on Fe in a temperature range of 25 to 55° C. to produce a suspension containing an iron hydroxide and having a pH of 7 to 9; and passing an oxygen-containing gas into said suspension while adjusting said pH value in the range of 7 to 9 to oxide said iron hydroxide.

In an eleventh aspect of the present invention, there is provided a process for producing rectangular parallelopipedic lepidocrocite particles as defined in the third aspect, comprising the steps of: mixing an aqueous ferrous sulfate, an aqueous alkali hydroxide and 0.1 to 5.0 mol % of at least one selected from the group consisting of a phosphorus compound and a citric compound based on Fe in a temperature range of 25 to 55° C. to produce a suspension containing an iron hydroxide and having a pH of 7 to 9; and passing an oxygen-containing gas into said suspension in the presence of seed crystals while adjusting said pH value in the range of 7 to 9 to oxide said iron hydroxide.

DETAILED DESCRIPTION OF THE INVENTION

Figure 1:
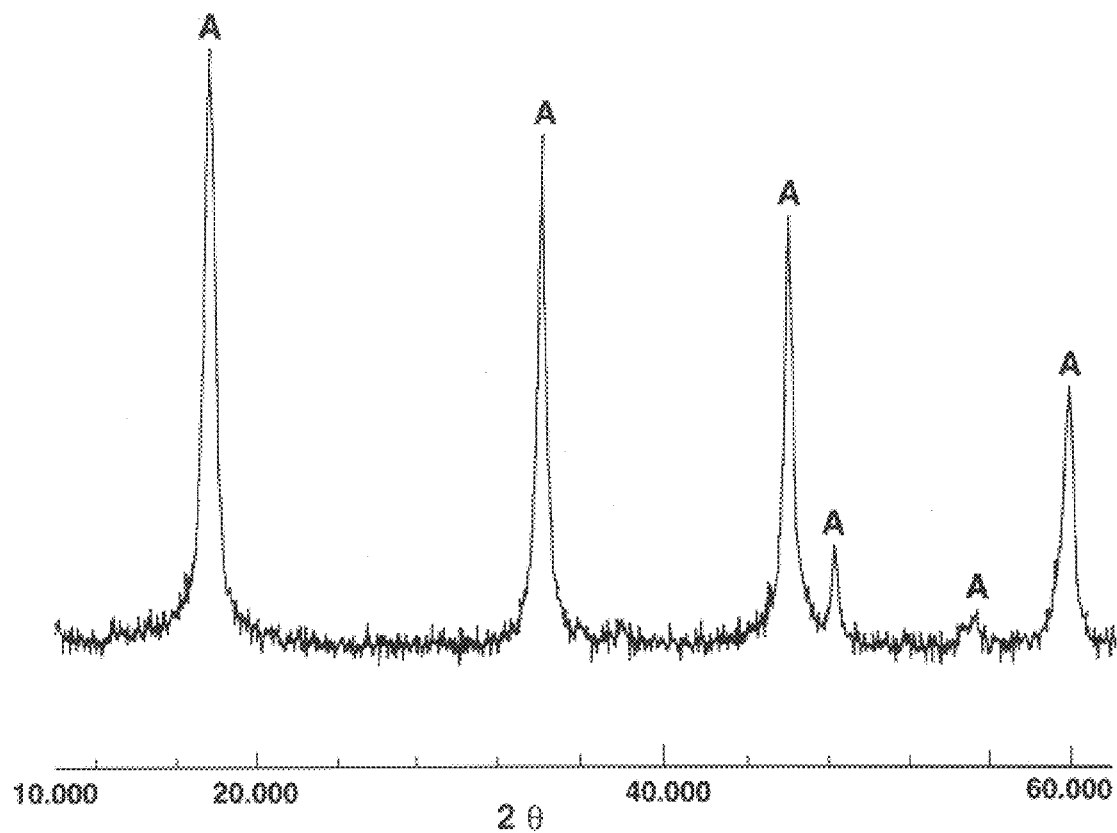
FIG. 1 shows a pattern obtained by the X-ray diffraction of rectangular parallelopipedic lepidocrocite particles obtained in an Example 1.

The lepidocrocite particles according to the present invention will first be described.

The lepidocrocite particles according to the present invention have a rectangular parallelopipedic shape. The rectangular parallelopipedic shape here means not only a hexahedron of rectangles but also a hexahedron in which an edge and a side may not always be straight but slightly intended or curved. If the shape of the particles is not rectangular parallelopipedic, it is impossible to obtain excellent tinting strength or hiding power. If such particles are used to produce a non-magnetic undercoat layer, it is impossible to make the surface smooth and the strength of the substrate having such an undercoat layer cannot be said to be sufficient.

The average minor axial diameter is 0.045 to 0.5 $\mu$m. If the average minor axial diameter is less than 0.045 $\mu$m, the particles become so fine that the intermolecular forces increase, thereby deteriorating the dispersibility. In addition, the particles become acicular, thereby making it impossible to have an excellent tinting strength or hiding power. If the minor axial diameter exceeds 0.5 $\mu$m, although the dispersibility of the particles into a vehicle and a resin is good, since the particles become coarse, it is impossible to obtain a smooth coated surface or a resin composition having a smooth surface. The preferable average minor axial diameter is 0.045 to 0.3 $\mu$m, more preferably 0.045 to 0.2 $\mu$m.

Also, if a non-magnetic undercoat layer is produced from lepidocrocite particles having a minor axial diameter of less than 0.045 $\mu$m, since the particles become so fine that the intermolecular forces increase, thereby deteriorating the dispersibility, it is impossible to obtain an undercoat layer having a smooth surface or a sufficiently high strength. If a non-magnetic undercoat layer is produced from lepidocrocite particles having a minor axial diameter exceeding 0.5 $\mu$m, although the dispersibility of the particles into a vehicle and a resin is good, since the particles become coarse, it is impossible to obtain an undercoat layer having a smooth surface or a sufficiently high strength.

The average major axial diameter is 0.05 to 1.0 $\mu$m. If it is less than 0.05 $\mu$m, the dispersibility is deteriorated due to an increase of the intermolecular forces. If it exceeds 1.0 $\mu$m, the particle becomes acicular, so that it is impossible to obtain an excellent tinting strength or hiding power. In addition, since the particles become coarse, it is impossible to obtain a smooth coated surface or a resin composition having a smooth surface. The preferable major axial diameter is 0.05 to 0.7 $\mu$m, more preferably 0.05 to 0.5 $\mu$m.

Also, if a non-magnetic undercoat layer is produced from lepidocrocite particles having a major axial diameter of less than 0.05 $\mu$m, since the particles become so fine that the intermolecular forces increase, thereby deteriorating the dispersibility, it is impossible to obtain an undercoat layer having a smooth surface or a sufficiently high strength. If a non-magnetic undercoat layer is produced from lepidocrocite particles having a minor axial diameter exceeding 1.0 $\mu$m, since the particles become acicular and coarse, it is impossible to obtain an undercoat layer having a smooth surface or a sufficiently high strength.

The average thickness of the lepidocrocite particles according to the present invention is 0.001 to 0.3 $\mu$m, preferably 0.001 to 0.2 $\mu$m, more preferably 0.001 to 0.1 $\mu$m. If the thickness is less than 0.001 $\mu$m, the dispersibility is deteriorated due to an increase in the intermolecular forces caused by too fine particles, and it is difficult to have a smooth surface or a sufficiently high strength of the non-magnetic undercoat layer. In addition, since the thickness of particles is reduced, it is impossible to have an excellent tinting strength or hiding power. If the thickness exceeds 0.30 $\mu$m, since the particles become coarse, it is impossible to obtain a non-magnetic undercoat layer having a smooth surface or a sufficiently high strength.

The ratio of the major axial diameter to the minor axial diameter of the particles (hereinunder referred to as "aspect ratio") is usually about 1.1:1 to about 5:1. With the consideration of the tinting strength and the hiding power of the lepidocrocite particles, the surface smoothness of an undercoat layer and the strength of a substrate, the preferable aspect ratio is 1.2:1 to 4.8:1.

The ratio of the minor axial diameter to the thickness of the lepidocrocite particles of the present invention is usually 1.2:1 to 50:1, preferably 2:1 to 20:1.

If the minor axial diameter/thickness is less than 1.2/1, or exceeds 50/1, it is sometimes difficult to obtain rectangular parallelopipedic particles which are excellent in dispersibility, tinting strength and hiding power as an object of the present invention.

The geometrical standard deviation of the major axial diameter of the lepidocrocite particles produced in the absence of seed crystals according to the present invention is usually not more than 1.70. The geometrical standard deviation is an index of the degree of a particle size distribution, and the smaller the value, the better the particle size distribution. If the geometrical standard deviation exceeds 1.70, the tinting strength and the hiding power may become insufficient. In addition, since the dispersibility is deteriorated, it is difficult to make the surface of a non-magnetic undercoat layer produced from the lepidocrocite particles smooth. A substrate having such an undercoat layer cannot be said to have a sufficient strength. With the consideration of tinting strength, hiding power and dispersibility, the geometrical standard deviation of the major axial diameter is preferably not more than 1.60, more preferably not more than 1.40. The lower limit of the geometrical standard deviation of the major axial diameter is about 1.01.

The geometrical standard deviation of the major axial diameter of the lepidocrocite particles produced in the presence of seed crystals according to the present invention is usually not more than 1.40. The geometrical standard deviation of the major axial diameter of the lepidocrocite particles produced in the presence of seed crystals according to the present invention is preferably not more than 1.38, more preferably not more than 1.35. The lower limit of the geometrical standard deviation of the major axial diameter is about 1.01.

The $SO_4$ content in the lepidocrocite particles of the present invention is usually not more than 1,000 ppm, preferably not more than 500 ppm, more preferably not more than 300 ppm, still more preferably not more than 200 ppm, most preferably not more than 150 ppm. In the lepidocrocite particles of the present invention, particles are individual without any crosslink between particles. The lower limit of the $SO_4$ content in the lepidocrocite particles is about 0.01 ppm.

If the $SO_4$ content is too much, the dispersibility of the lepidocrocite particles is deteriorated. When the lepidocrocite particles are used as non-magnetic particles for a non-magnetic undercoat layer, the preferable $SO_4$ content is not more than 300 ppm.

The hue of the pigment of the present invention comprising rectangular parallelopipedic lepidocrocite particles having a minor axial diameter of 0.045 to 0.5 μm, a major axial diameter of 0.05 to 1.0 μm, and a thickness of 0.001 to 0.3 μm is represented by an a* value of usually 15.0 to 50.0, a b* value of usually 20.0 to 55.0 and an L* value of usually 20.0 to 70.0.

If the a* value exceeds 50.0, the reddening effect may be unfavorably too strong. If it is less than 15.0, the reddening effect may be unfavorably insufficient.

If the b* value exceeds 55.0, the yellowing effect may be unfavorably too strong. If it is less than 20.0, the yellowing effect may be unfavorably insufficient for expressing an orange color.

If the L* value exceeds 70.0, the color of the pigment may be unfavorably too bright. If it is less than 20.0, the color unfavorably may become dark and dull.

Although a variation in the geometrical standard deviation does not influence the hue such as a*, b* and L* values, it produces a slight difference in the turbidity. The smaller the geometrical standard deviation, the smaller the turbidity tends to become.

The paint according to the present invention comprises 0.1 to 200 parts by weight of a pigment comprising lepidocrocite particles and 100 parts by weight of a paint base material. Such a paint includes a water-based paint and a solvent-based paint.

As for the ratio of the pigment comprising lepidocrocite particles to the paint base material, the preferable amount of pigment is 0.1 to 100 parts by weight, more preferably 0.1 to 50 parts by weight based on 100 parts by weight of the paint base material in view of handling of the coating material.

The paint base material for solvent-based paints in the present invention comprises a resin, a solvent and optionally suitable additives such as extender pigment, drying accelerator, surfactant, curing promoter, auxiliaries, etc.

The resins usable as a component of the paint base material in the present invention include those commonly used for solvent-based paints, such as vinyl chloride-vinyl acetate copolymer resin, vinyl chloride resin, vinyl acetate resin, nitrocellulose resin, polyvinyl butyral resin, acrylic resin, alkyd resin, amino-alkyd resin, polyester resin, polyurethane resin, epoxy resin, phenol resin, melamine resin, amino resin, etc.

As solvents, those commonly used for solvent-based paints can be used. Examples of them are toluene, xylene, butyl acetate, methyl acetate, methyl isobutyl ketone, butyl cellosolve, ethyl cellosolve, butyl alcohol, methyl ethyl ketone, cyclohexanone, etc.

The amount of solvent in the paint base material for solvent-based paints in the present invention is usually 50 to 5,000 parts by weight, preferably 100 to 2,000 parts by weight based on 100 parts by weight of the resin. When the amount of solvent is less than 50 parts by weight based on 100 parts by weight of the resin, the vehicle viscosity may become too high to perform homogeneous mixing and dispersion. When the amount exceeds 5,000 parts by weight, the solvent moiety in the coating composition increases to such an extent that dispersing shear force may not act to the particles during mixing and dispersion. Also, the amount of additives in the paint base material for solvent-based paints in the present invention is usually not more than 100 parts by weight, preferably 0.1 to 50 parts by weight based on 100 parts by weight of the resin.

A solvent-based paint produced by using the lepidocrocite particles of the present invention has a tinting strength of 4 to 5, a hiding power of not more than 25, preferably not more than 23. The preferable lower limit of the hiding power is 10. The gloss of the coated surface of a coated piece is not less than 75%, preferably not less than 78%, and the preferably upper limit is 140%.

The paint base material used for water-based paints in the present invention comprises a resin, water and optionally suitable additives such as a solvent, an extender, a pigment, a dry accelerator, a surfactant, a curing promoter, auxiliaries, etc.

For the water-based paints, the commonly used resins such as water-soluble alkyd resin, water-soluble acrylic resin, water-soluble urethane resin, water-soluble epoxy resin, water-soluble melamine resin, acrylic emulsion resin, acryl-styrene emulsion resin, urethane emulsion resin, epoxy emulsion resin, vinyl acetate emulsion resin, etc. can be used.

For water-based paints, butyl cellosolve, butyl alcohol and other commonly used for water-based paints can be used.

The amount of water in the paint base material for water-based paints in the present invention is usually 50 to 5,000 parts by weight, preferably 100 to 2,000 parts by weight based on 100 parts by weight of the resin. When the amount of water is less than 50 parts by weight based on 100 parts by weight of the resin, the vehicle viscosity may become too high to perform homogeneous mixing and dispersion. When the amount exceeds 5,000 parts by weight, the water moiety in the coating composition increases to such an extent that dispersing shear force may not act to the particles during mixing and dispersion. Also, the amount of additives in the paint base material for water-based paints in the present invention is usually not more than 100 parts by weight, preferably 0.1 to 50 parts by weight based on 100 parts by weight of the resin.

A water-based paint produced from the lepidocrocite particles of the present invention has a tinting strength of 4 to 5, a hiding power of not more than 29, preferably not more than 27. The preferable lower limit of the hiding power is 15. The gloss of the coated surface of a coated piece is not less than 71%, preferably not less than 75%, and the preferably upper limit is 130%.

The rubber or resin composition according to the present invention comprises 0.1 to 10.0 part by weight, preferably 0.5 to 5 parts by weight of the pigment comprising lepidocrocite particles based on 100 parts by weight of the rubber or resin composition and 90 to 99.9 parts by weight, preferably 95 to 99.5 parts by weight of a rubber or thermoplastic resin based on 100 parts by weight of the rubber or resin composition.

Thermoplastic resins usable in the present invention are polyvinyl chloride resin, polyester resin, polypropylene resin, polyethylene resin, polyamide resin, polycarbonate resin, ABS resin (acrylonitryl-butadiene-styrene copolymer), etc. The thermoplastic resins may be used in the form of powder, beads or pellets, but from the point of view of kneadability with pigment, the thermoplastic resins may be preferably used in the form of powder. The polyvinyl chloride resin, polyethylene resin, polyamide resin and ABS resin are preferred.

The rubber usable in the present invention is natural rubber, polyisoprene rubber, styrene-butadiene rubber, ethylene-propylenediene rubber, acrylonitryl-butadiene rubber, silicon rubber or the like.

When the amount of rubber or thermoplastic resin is less than 90.0 parts by weight, it is difficult to suppress the deterioration of the rubber or the thermoplastic resin. On the other hand, when the amount of rubber or thermoplastic resin exceeds 99.9 parts by weight, it is difficult to adequately color the rubber or the thermoplastic resin.

When the amount of pigment 0.1 part by weight, it is difficult to adequately color the rubber or the thermoplastic resin. If the amount of pigment exceeds 10.0 parts by weight, it is difficult to suppress the deterioration of the rubber or the thermoplastic resin.

The rubber or the resin composition according to the present invention is obtained by mixing pigment with a rubber or resin material, crushing the aggregates of the lepidocrocite particles with a strong shearing force of a kneading machine or an extruder under heating, and uniformly dispersing the lepidocrocite particles in the rubber or the resin material. The thus-obtained rubber or resin composition is molded into a suitable shape.

The rubber or resin composition composed of the pigment and the rubber or the thermostatic resin according to the present invention may contain an additive such as lubricant, plasticizer, antioxidant, ultraviolet absorber, and stabilizer.

The amount of additive is not more than 50 parts by weight based on 100 parts by weight of the total amount of pigment and rubber or thermoplastic resin. If the amount of additive exceeds 50 parts by weight, the moldability is lowered.

The dispersibility of the rubber or resin composition produced by using the lepidocrocite particles of the present invention is 4 to 5. The dispersibility is evaluated in the later-described method.

The process for producing the above-described lepidocrocite particles of the present invention will now be described.

The aqueous ferrous salt used in the present invention is an aqueous ferrous sulfate.

Examples of the aqueous alkali hydroxide solution used in the present invention are an aqueous sodium hydroxide and aqueous potassium hydroxide.

As the phosphorus compound used in the present invention, phosphoric acids such as orthophosphoric acid, metaphosphoric acid, pyrophosphoric acid, triphosphoric acid and tetraphosphoric acid; sodium salts thereof such as disodium hydrogenphosphate, sodium dihydrogenphosphate and trisodium phosphate; ammonium salts thereof such as ammonium dihydrogenphosphate, diammonium hydrogenphosphate and sodium ammonium hydrogenphosphate; and potassium salts thereof such as tripotassium phosphate, potassium dihydrogenphosphate and dipotassium hydrogenphosphate are usable in the present invention.

The citric compounds used in the present invention are, for example, citric acid; ammonium salts such as ammonium citrate and ammonium hydrogencitrate; potassium salts such as potassium citrate and potassium hydrogencitrate; sodium salts such as sodium citrate and sodium hydrogencitrate; and lithium salts such as lithium citrate.

There is no special order in the addition of the aqueous ferrous sulfate, the aqueous alkali hydroxide solution and the phosphorus compound and/or the citric compound. They may also be simultaneously added. In any case, the lepidocrocite particles as an object of the present invention are obtained.

In order to produce only lepidocrocite particles without any other particles mixed therewith, it is preferable to mix the aqueous ferrous sulfate, the aqueous alkali hydroxide solution and the phosphorus compound and/or the citric compound as uniformly as possible.

For this purpose, it is preferable to mix the phosphorus compound and/or the citric compound with the aqueous ferrous sulfate in advance, and to add the mixed solution to the aqueous alkali hydroxide solution. More preferably, the mixed solution is aged before it is added to the aqueous alkali hydroxide solution.

The aging time for the mixed solution is preferably not less than 10 minutes, more preferably not less than 30 minutes. The upper limit of the aging time is not specifically limited, but from the point of view of industry, it is preferably about 120 minutes.

The mixed solution may be added to the aqueous alkali hydroxide solution at one time, but in the consideration of uniform mixture of the aqueous solution, the mixed solution is preferably added continuously or intermittently little by little in 10 to 120 minutes, more preferably in 50 to 70 minutes.

The mixing ratio of the aqueous ferrous sulfate and the aqueous alkali hydroxide solution is selected so that the pH value of the suspension containing the hydroxides produced by the reaction of the aqueous ferrous sulfate and the aqueous alkali hydroxide solution may be in the range of 7 to 9. If the pH value of the suspension is less than 7, acicular goethite particles may be produced together with the lepidocrocite particles. If the pH value of the suspension exceeds 9, granular magnetite particles may be produced together with the lepidocrocite particles.

The mixing ratio of the phosphorus compound and/or the citric compound and the aqueous ferrous sulfate is 0.1 to 5 mol % based on Fe. If it is less than 0.1 mol %, it is difficult to produce only lepidocrocite particles and granular magnetite particles are also mixed therewith. If it exceeds 5 mol %, although lepidocrocite particles are obtained, the effect of addition is saturated. It is meaningless to add the compound more than necessary.

It is necessary that the phosphorus compound and/or the citric compound is added before an oxygen-containing gas is passed into the suspension. The phosphorus compound and/or the citric compound is added in any of the aqueous ferrous sulfate, the aqueous alkali hydroxide solution and the suspension containing the precipitate containing iron.

In order to produce only lepidocrocite particles without other particles mixed therewith, the phosphorus compound and/or the citric compound is preferably added to the aqueous ferrous sulfate, as described above.

The temperature for mixing the raw materials is 25 to 55° C. If it is lower than 25° C., the reaction takes a long time, which is industrially and economically disadvantageous. If the temperature exceeds 55° C., granular magnetite particles and the like are produced together with the lepidocrocite particles.

The pH value of the resultant mixture of the raw materials is adjusted in the range of 7 to 9. If the pH value is out of this range, it is difficult to produce only lepidocrocite particles. If the pH value is less than 7, the lepidocrocite particle produced contain a large amount of sulfur-containing iron salt.

The oxidation of the suspension containing an iron hydroxide is conducted by passing an oxygen-containing gas (e.g., air) into the suspension. The amount of gas passed is preferably 0.5 to 100 liter/minute based on 10 liter of the reaction mother liquid.

The oxidation reaction temperature is 25 to 55° C. If it is lower than 25° C., the oxidation reaction takes a long time, which is industrially and economically disadvantageous. If the temperature exceeds 55° C., granular magnetite particles and the like are produced together with the lepidocrocite particles.

In the oxidation reaction in the present invention, since the pH value gradually decreases with the progress of the oxidation reaction, the pH value during the oxidation reaction is adjusted to the range of 7 to 9 by adding an aqueous alkali solution such as sodium hydroxide. If the pH value is less than 7, it is difficult to produce only lepidocrocite particles, and acicular goethite particles mat be disadvantageously produced together therewith. If the pH value of the suspension exceeds 9, it is difficult to produce only lepidocrocite particles, and granular magnetite particles may be disadvantageously produced together therewith.

The oxidation reaction time from the start to the end of the oxidation reaction is not more than 24 hours, preferably not more than 12 hours. For this reason, the yield (yield per unit volume·unit time) is as large as 4.3 to 15.6 kg/m$^3$·hr, which is industrially and economically advantageous.

Since there is no change in the pH value when the production reaction of lepidocrocite particles ends and no oxidation reaction proceeds any longer, the point at which the pH value is constant and no addition of NaOH solution for adjusting the pH is necessitated, is regarded as the end point of the oxidation reaction.

Namely, in the process for producing lepidocrocite particles, when the pH value is in the range of 7 to 9 and the reaction temperature is 25 to 55° C., it is possible to produce lepidocrocite particles with stability.

If neither of the phosphorus compound and the citric compound or the mixture thereof is added in the process of the present invention, particles other than lepidocrocite particles are produced together with lepidocrocite particles, as will be shown in later-described comparative examples. From this fact, it is clear that the presence of the phosphorus compound and/or the citric compound contributes that only lepidocrocite particles are produced with stability.

Since the lepidocrocite particles of the present invention are produced in the approximately neutral range in which the pH value is 7 to 9, the amount of slightly soluble sulfur-containing iron salt which causes agglomeration is small, so that the particles are individual.

Lepidocrocite particles having a more excellent particle size distribution in which the geometrical standard deviation of the major axial diameter is not more than 1.40 are obtained by passing an oxygen-containing gas into the suspension containing the iron hydroxide and having a pH of 7 to 9 in the presence of seed crystals in the above-described process.

The seed crystals may be any of iron hydroxides such as colloidal ferrous hydroxide, colloidal ferric hydroxide and green rust, iron oxides such as hematite, magnetite and maghemite, and ferric oxide hydroxides such as goethite, lepidocrocite and akageneite which are obtained by a known process. These seed crystals may be produced in the same reactor that is used for the production of the lepidocrocite particles of the present invention. Alternatively, a different reactor may be used. From the point of view of the distribution of the major axial diameters of the lepidocrocite particles as the objective, individual particles containing few agglomerates are preferable.

The seed crystals are preferably produced by (i) mixing the aqueous ferrous sulfate, the aqueous alkali hydroxide solution and 0.1 to 5.0 mol % of the phosphorus compound and/or the citric compound based on Fe at a temperature of 25 to 55° C. while maintaining the pH values in the range of 7 to 9, thereby obtaining hydroxides of iron, or (ii) further blowing air into the suspension containing the hydroxides of iron so as to obtain lepidocrocite seed crystals.

The abundance of the seed crystal is preferably 0.001 to 0.5 mol/liter based on Fe. If it is less than 0.001 mol/liter, the abundance of the seed crystal is so small that it is difficult to produce lepidocrocite particles having an excellent particle size distribution because of ununiform crystal growth. On the other hand, if the abundance exceeds 0.5 mol/liter, there are so many seed crystals that the growth of the particles becomes insufficient.

When the lepidocrocite particles of the present invention are dispersed into a binder resin, the lepidocrocite particles may be coated, if necessary, with at least one selected from the group consisting of hydroxides of aluminum, oxides of aluminum, hydroxides of silicon and oxides of silicon of 0.01 to 50.0 wt % (calculated as Al and $SiO_2$) based on the weight of the lepidocrocite particles in order to improve the affinity for the binder resin and to enhance the dispersibility.

The size of the lepidocrocite particles with the surfaces coated with the above-described coating material is substantially the same with the size of the lepidocrocite particles being coated. The average minor axial diameter of the coated lepidocrocite particles is 0.045 to 0.5 $\mu$m, the average major axial diameter thereof is 0.05 to 1.0 $\mu$m, and the average thickness thereof is 0.001 to 0.3 $\mu$m. The coated lepidocrocite particles also have a rectangular parallelopipedic shape.

The method of coating the lepidocrocite particles will be explained in the following.

The lepidocrocite particles are dispersed into an aqueous solution to obtain an aqueous suspension. An aluminum compound and/or a silicon compound is added to the aqueous suspension, and the resultant mixture is stirred, and the pH value is adjusted, if necessary, so that the surfaces of the lepidocrocite particles are coated with at least one of the group consisting of hydroxides of aluminum, oxides of aluminum, hydroxides of silicon and oxides of silicon. The lepidocrocite particles are then filtered out, washed with water, dried and pulverized by an ordinary method. Furthermore, the coated lepidocrocite particles may be subjected to deaeration and compaction, if necessary.

As the aluminum compound, aluminum salts such as aluminum acetate, aluminum sulfate, aluminum chloride and aluminum nitrate, aluminic alkali salts such as sodium aluminate, alumina sol, etc. are usable.

As the silicon compound, water glass, sodium orthocate, sodium metasilicate, colloidal silica, etc. are usable.

The amount of aluminum compound and silicon compound added is usually 0.01 to 50.0 wt % (calculated as Al and $SiO_2$), respectively, based on the weight of the lepidocrocite particles. When the amount is less than 0.01 wt %, the dispersion of the lepidocrocite particles become insufficient. When the amount exceeds 50.0 wt %, the coating effect is saturated. It is meaningless to add more than necessary.

When the aluminum compound and the silicon compound are used together, the amount thereof is preferably 0.01 to 50.0 wt % (calculated as Al and $SiO_2$) based on the weight of lepidocrocite particles.

The substrate for a magnetic recording medium according to the present invention will now be explained.

The substrate of the present invention comprises a non-magnetic substrate and a non-magnetic undercoat layer formed on the non-magnetic substrate. The thickness of the base is preferably 1.2 to 310 $\mu$m, more preferably 2.5 to 60 $\mu$m, still more preferably 3.0 to 25 $\mu$m.

As the non-magnetic substrate such as a base film, synthetic resin films such as polyethylene terephthalate, polyethylene, polypropyrene, polycarbonate, polyethylene naphthalate, polyamide, polyamideimide and polyimide, metal foils such as aluminum and stainless steel foils and sheets, and various types of paper, which are now generally used for magnetic recording media, may be used. The thickness of the substrate is different depending upon the material, but generally 1.0 to 300 $\mu$m, preferably 2.0 to 200 $\mu$m.

In case of a magnetic disc, polyethylene terephthalate is usually used as the non-magnetic substrate and the thickness thereof is usually 50 to 300 $\mu$m, preferably 60 to 200 $\mu$m. In the case of a magnetic tape, (1) when polyethylene terephthalate is used, the thickness is usually 3 to 100 $\mu$m, preferably 4 to 20 $\mu$m, (2) when polyethylene naphthalate is used, the thickness is usually 3 to 50 $\mu$m, preferably 4 to 20 $\mu$m, and (3) when polyamide is used, the thickness is usually 2 to 10 $\mu$m, preferably 3 to 7 $\mu$m.

The non-magnetic undercoat layer is produced by applying a non-magnetic coating material containing non-magnetic particles, a binder resin and a solvent onto the above-described non-magnetic substrate, and drying the coating material. The film thickness is preferably 0.2 to 10 $\mu$m, more preferably 0.5 to 5 $\mu$m. If the film thickness is less than 0.2 $\mu$m, not only it is difficult to improve the surface roughness of the non-magnetic substrate but also the strength may be insufficient. The thickness exceeding 10 $\mu$m is permissible, but a thickness of not more than 10 $\mu$m is preferable in order to produce a thin-layered magnetic recording medium.

As the binder resin, various binder resins which are generally used for the production of magnetic recording media are usable. Examples thereof are vinyl chloride-vinyl acetate copolymer, urethane resin, vinyl chloride-vinyl acetate-maleic acid-urethane elastomer, butadiene-acrylonitrile copolymer, polyvinyl butyral, cellulose derivatives such as nitrocellulose, polyester resin, synthetic rubber resin such as polybutadiene, epoxy resin, polyamide resin, polyisocyanate polymer, electron radiation curing acryl urethane resin and mixtures thereof. Each of these resin binders may has an anchor group such as —OH, —COOH, —$SO_3M$ —$OPO_2M_2$ and —$NH_2$, wherein M represents H, Na or K.

The mixing ratio of the lepidocrocite particles to the binder resin is 5 to 2,000 parts by weight, preferably 100 to 1,500 parts by weight based on 100 parts by weight of the binder resin. If the mixing ratio of the lepidocrocite particles is less than 5 parts by weight, the amount of lepidocrocite particles in the vehicle is so small that it is impossible to produce a coating film constituted by a layer consisting of continuous lepidocrocite particles. As a result, it is difficult to obtain the surface smoothness aimed at in the present invention, and the strength of the substrate cannot be said to be sufficient. If the mixing ratio of the lepidocrocite particles exceeds 2,000 parts by weight, since the number of lepidocrocite particles in the coating material is too large and the amount of binder resin becomes short, it is impossible to obtain a good non-magnetic coating material. As a result, the surface roughness is inferior, and since the particles are not bound, the coating film is likely to become very fragile.

It is possible to add a lubricant, a polishing agent, an antistatic agent, etc. which are generally used for the production of a magnetic recording medium to the non-magnetic undercoat layer of the present invention.

In the substrate of the present invention, the coating film (non-magnetic undercoat layer) has a gloss of 120 to 200%, preferably 130 to 200%, a surface roughness Ra of not more than 15 nm, preferably 2.0 to 12.0 nm, more preferably 2.0 to 10.0 nm, and a Young's modulus of 110 to 160, preferably 120 to 160 in relative value.

The mixing ratio of the solvent in the non-magnetic coating material is preferably 50 to 2,000 parts by weight based on 100 parts by weight of the binder resin material and the lepidocrocite particles in total amount.

Examples of the usable solvent are methyl ethyl ketone, toluene, cyclohexanone, methyl isobutyl ketone and tetrahydrofuran.

The magnetic recording medium according to the present invention will now be described.

The magnetic recording medium of the present invention comprises a non-magnetic substrate, a non-magnetic undercoat layer formed on the non-magnetic substrate, and a magnetic recording layer formed on the non-magnetic undercoat layer.

The magnetic recording layer in the magnetic recording medium of the present invention is produced by applying a magnetic coating material comprising magnetic particles, a binder resin and a solvent onto the non-magnetic undercoat layer, and drying the coating material. The film thickness of the magnetic recording layer is preferably 0.01 to 3.0 $\mu$m, more preferably 0.05 to 2.0 $\mu$m.

The binder resins and solvents usable for the magnetic recording layer are the same as those usable for the non-magnetic undercoat layer.

As the magnetic particles in the magnetic recording layer are usable magnetic iron oxide particles such as maghemite particles, magnetite particles, berthollide particles as an intermediate oxide between maghemite and magnetite, magnetic iron oxide particles containing elements other than Fe such as Co, Al, Ni, P, Zn, Si and B, magnetic iron oxide particles coated with Co or the like, magnetic iron-based alloy particles, magnetic iron-based alloy particles containing elements other than Fe such as Co, Al, Ni, P, Zn, Si and B and plate-like composite ferrite particles containing a divalent metal such as Co, Ni and Zn and a quadrivalent metal such as Ti, Sn and Zr. The shape of the magnetic particles is not specified and, for example, acicular, spindle-shaped, cubic and plate-like particles are usable.

The mixing ratio of the magnetic particles to the binder resin in the magnetic recording layer is 50 to 2,000 parts by weight, preferably 200 to 1,500 parts by weight based on 100 parts by weight of the binder resin. If the mixing ratio of the magnetic particles is less than 50 parts by weight, there is possibility of not obtaining a sufficient signal recording property, If the mixing ratio of the magnetic particles exceeds 2,000 parts by weight, although a sufficient signal recording property is obtained, since the amount of binder resin is too small as compared with the magnetic particles, good dispersion is difficult. In addition, since the magnetic particles are not bound, there is possibility of the coating film being very fragile.

The mixing ratio of the solvent in the magnetic coating material is preferably 50 to 2,000 parts by weight based on 100 parts by weight of the binder resin and the magnetic particles in the total amount. If the mixing ratio of the solvent is less than 50 parts by weight, the amount of solvent is so small that there is possibility of the viscosity of the coating material becoming too high. If the mixing ratio of the solvent exceeds 2,000 parts by weight, although the viscosity of the coating material is low, since a very large amount of solvent volatalizes, it is industrially disadvantageous.

The solvents usable for the magnetic coating material are the same as those usable for the non-magnetic coating material.

It is possible to add, to the magnetic recording layer, a lubricant, a polishing agent, an antistatic agent, etc. which are generally used for the production of a magnetic recording medium.

The magnetic recording medium of the present invention has a coercive force Hc of 500 to 3,500 Oe, preferably 800 to 3,500 Oe, and a squareness density (residual magnetic flux density/saturation magnetic flux density) Br/Bm of 0.84 to 0.95, preferably 0.85 to 0.95. The gloss of the coating film (magnetic recording layer) is 170 to 300%, preferably 175 to 300 %, the surface roughness Ra of the coating film (magnetic recording layer) is not more than 12 nm, preferably 2.0 to 10 nm, more preferably 2.0 to 8.5 nm, and the Young's modulus is 110 to 160, preferably 120 to 160.

In the present invention, when an aqueous ferrous sulfate, an aqueous alkali hydroxide and 0.1 to 5.0 mol % of at least one selected from the group consisting of a phosphorus compound and a citric compound based on Fe are mixed at a temperature of 25 to 55° C., a suspension containing an iron hydroxide having a pH of 7 to 9 is obtained, and when an oxygen-containing gas is passed into this suspension while adjusting the pH value to 7 to 9 at a temperature of 25 to 55° C., individual rectangular parallelopipedic lepidocrocite particles having a minor axial diameter of 0.045 to 0.5 $\mu$m, a major axial diameter of 0.05 to 1.0 $\mu$m, and a thickness of 0.001 to 0.3 $\mu$m are obtained. That is, in the present invention, it is possible to stably produce only lepidocrocite particles free from any other different kind of particles mixed therewith in the pH range of 7 to 9 and in the temperature range of 25 to 55° C.

In the present invention, the reason why the lepidocrocite particles are individual is considered to be that since the lepidocrocite particles are produced in the pH range of 7 to 9, the amount of slightly soluble sulfur-containing iron salt is small, as will be shown in later-described examples.

In the present invention, the reason why lepidocrocite particles are produced with stability in the pH range of 7 to 9 and in the temperature range of 25 to 55° C. is considered to be that the presence of a phosphorus compound and/or a citric compound exerts influence on the enlargement of the range in which only lepidocrocite particles are produced with stability from the fact that particles other than lepidocrocite particles are produced together with lepidocrocite particles when there is neither of a phosphorus compound and a citric compound, as will be shown in later-described comparative examples.

In the present invention, a substrate produced by forming a non-magnetic undercoat layer comprising a coating film composition comprising rectangular parallelopipedic lepidocrocite particles having a minor axial diameter of 0.045 to 0.5 $\mu$m, a major axial diameter of 0.05 to 1.0 $\mu$m and a thickness of 0.001 to 0.3 $\mu$m and a binder resin, on a non-magnetic substrate, has a smooth surface and a high strength.

In the present invention, the reason why the substrate of the present invention has a smooth surface is considered to be that the shape of the non-magnetic particles is rectangular parallelopipedic and the rectangular parallelopipedic particles are individual, from the fact that the gloss and the surface roughness are inferior both when acicular or granular non-magnetic particles are used or when agglomerated particles in the non-magnetic particles due to soluble sulfates are contained, as will be shown in later-described comparative examples.

In the present invention, the reason why the substrate of the present invention has a high strength is considered to be that the individual rectangular parallelopipedic particles are uniformly dispersed in the horizontal direction while the end portion of one particle overlaps the end portion of another particle.

Since the lepidocrocite particles of the present invention have a rectangular parallelopipedic shape, and they are individual because there are little slightly soluble sulfur-containing iron salt, the lepidocrocite particles are excellent in dispersibility. In addition, since the lepidocrocite particles are excellent in tinting strength and hiding power due to the shape, they are suitable as an orange coloring pigment.

According to the process for producing lepidocrocite particles of the present invention, since the reaction is carried out in a temperature range of 25 to 55° C. which does not cause corrosion in a reactor or the like and which does not necessitate cooling, a large amount of heat energy is not necessary and it is possible to produce the target lepidocrocite particles industrially and economically advantageously. In addition, since the yield is high, the process is industrially and economically advantageous.

Since the lepidocrocite particles of the present invention have a rectangular parallelopipedic shape and are individual because there are little slightly soluble sulfur-containing iron salt, when they are dispersed into a non-magnetic undercoat layer, it is possible to make the surface of the non-magnetic undercoat layer smooth. In addition, since it is possible to strengthen the non-magnetic substrate, they are suitable as non-magnetic particles for non-magnetic undercoat layers of non-magnetic recording media.

In the magnetic recording medium of the present invention, since the lepidocrocite particles are used for the non-magnetic undercoat layer of the magnetic recording medium, it is possible to obtain a substrate having a high strength. Since a magnetic recording layer is formed on the non-magnetic substrate, even if the magnetic recording layer is thin, it has a smooth surface and a uniform thickness, so that the magnetic recording medium is suitable for high-density recording.

EXAMPLES

The present invention will now be described in more detail with reference to the following examples and comparative examples, but the present invention is not restricted to those examples and various modifications are possible within the scope of the invention.

The properties in the examples were measured by the following methods.

(1) Major axial diameter and minor axial diameter of particles:

The major axial diameters and the minor axial diameters of about 350 particles shown in an electron micrographs (×30,000) which was magnified 4 times vertically and horizontally enlarged were measured. The major axial diameter and the minor axial diameter in each example and comparative example are expressed by the respective average values.

(2) Thickness of particles:

The thickness of about 100 particles in a lying state where selected from the micrograph used in (1) were measured. The thickness in each examples and comparative examples are expressed by the respective average value.

(3) Geometrical standard deviation (σg) of major axial diameters of particles:

On logarithmico-normal probability paper, the major axial diameters are plotted on the abscissa-axis on the basis of the measured major axial diameters of particles shown in the enlarged micrographs used in (1), and the accumulative number of particles (under integration sieve) belonging to each interval of the major axial diameters was plotted by percentage on the ordinate-axis by a statistical technique. The major axial diameters corresponding to the number of particles of 50 and 84.13%, respectively, were read from the graph, and the geometrical standard deviation σg was measured from the following formula:

Geometrical standard deviation (σg)=[major axial diameter (geometrical average diameter) corresponding to the number of particles of 84.13% under integration sieve]/[major axial diameter (geometrical average diameter) corresponding to the number of particles of 50% under integration sieve]

The smaller the geometrical standard deviation, the more excellent the particle size distribution of the major axial diameter of the particles.

(4) Specific surface area:

The specific surface area was measured by a BET method.

(5) $SO_4$ content:

5 g of a sample was weighed and charged into a 300-ml triangular flask, and 100 ml of pure water was added thereto. The suspension was heated and boiled for about 5 minutes so as to solve the slightly soluble sulfur-containing iron salt on the particle surfaces. The supernatant liquid obtained was filtered through No. 5C filter paper, and the $SO_4^{2-}$-content in the filtrate was measured by an inductively coupled plasma emission spectrophotometer (manufactured by Seiko Instruments and Electronics, Ltd.).

(6) Al content and $SiO_2$ content:

The Al content and the $SiO_2$ content on the surfaces of the lepidocrocite particles were measured by fluorescent X-ray analysis.

(7) Hue of particles:

0.5 g of the lepidocrocite particles and 0.7 cc of castor oil were kneaded in the form of a paste by a Hoover muller, and 4.5 g of a clear lacquer was added to the paste. The resultant mixture was kneaded and the thus-obtained paint was applied onto paper by an 6-mil applicator of a cast coater so as to produce a coated test piece (film thickness: about 30 μm) for measuring the hue.

The colorimiteric indices L* value, a* value, and b* value of the test piece were measured by using a light-source spectrophotometric colorimeter MSC-1S-2D (manufactured by Suga Testing Machine, Ltd.), and expressed in accordance with JIS Z 8729.

The a* value represents a reddening effect. The larger the value, the stronger the reddening effect.

The b* value represents a yellowing effect. The larger the value, the stronger the yellowing effect. It is, therefore, possible to represent an orange color by the a* value and the b* value.

The L* value represents lightness.

(8) Dispersibility in paint vehicle:

The dispersibility was judged from the gloss of the coated surface of a coated test piece, as will be shown in a later-described example.

(9) Gloss of the paint:

The gloss of a coated test piece was obtained by measuring the gloss at 60° of the coated surface by Glossmeter UGV-5D" (manufactured by Suga Testing Machine Ltd.) The larger the gloss, the more excellent the dispersibility of the particles.

(10) Dispersibility in resin composition:

The number of agglomerating particles which were not distributed on the surfaces of the resin composition obtained were visually estimated in five stages:

1: not less than 50 particles per $cm^2$,
2: not less than 10 and less than 50 particles per $cm^2$,
3: not less than 5 and less than 10 particles per $cm^2$,
4: less than 5 particles per $cm^2$,
5: no agglomerating particles per $cm^2$.

The stage 5 represents the best distribution state.

(11) Hiding power:

The hiding power of a paint was obtained in accordance with the criptometer method described in '8.2 Hiding power' in "Pigment testing method" JIS K5101-1991. The hiding power is represented by the value of the division at which the boundary line becomes hidden from view. The larger the value, the smaller the hiding power.

(12) Tinting strength of paint:

A paint obtained was mixed with a standard white paint ($TiO_2$: TCR73, produced by Tochem Products Co., Ltd.) in the ratio of 1:10 (by weight). The degree of coloring of the colored paint obtained was visually estimated in five stages:

1: coloring was scarcely visible,
2: slightly colored,
3: evidently colored,
4: considerably colored,
5: conspicuously colored The stage 5 represents the largest tinting strength.

(13) Gloss of the surface of the coating film of non-magnetic undercoat layer and magnetic recording layer:

The gloss was obtained by measuring the gloss at 45° of a coating film by "Glossmeter UGV-5D" (manufactured by Suga Testing Machine Ltd.).

(14) Surface roughness Ra of the coating film of non-magnetic undercoat layer and magnetic recording layer:

The Surface roughness was expressed by the center-line average roughness of the surface of the coating film by using "Surfcom-575A" (manufactured by Tokyo Seimitsu Co., Ltd.).

(15) Strength of coating film:

The Young's modulus of the coating film was measured by "Autograph" (manufactured by Shimazu Seisakusho Ltd.). The strength was represented by the relative value of the thus-obtained Young's modulus and that of a commercially available video tape "AV T-120" (produced by Victor Company of Japan, Ltd.). The higher the relative value, the more favorable.

(16) Magnetic characteristics of magnetic recording medium:

The magnetic characteristics were measured by using "Vibration Sample Magnetometer VSM-3S-15" (manufactured by Toei Kogyo Co., Ltd.) and applying an external magnetic field up to 10 kOe.

(17) Thickness of each of the non-magnetic substrate, non-magnetic undercoat layer and magnetic recording layer which constitute magnetic recording medium:

The film thickness of a non-magnetic substrate was first measured by "Digital Electron Micrometer K351C" (manufactured by Anritsu Corp.).

The thickness (total sum of the thickness of the non-magnetic substrate and the thickness of a non-magnetic undercoat layer) of the substrate obtained by forming the non-magnetic undercoat layer on the non-magnetic substrate was then measured in the same way.

Furthermore, the thickness (total sum of the thickness of the non-magnetic substrate, the thickness of the non-magnetic undercoat layer and the thickness of a magnetic recording layer) of the magnetic recording medium obtained by forming the magnetic recording layer on the non-magnetic undercoat layer was then measured in the same way.

The thickness of the non-magnetic undercoat layer was represented by the difference between the thickness of the substrate and the non-magnetic substrate, and the thickness of the magnetic recording layer was represented by the difference between the thickness of the magnetic recording medium and the thickness of the substrate.

EXAMPLE 1

Production of lepidocrocite particles

The following solution A was prepared in advance and charged into a chamber at 35° C.

Solution A:

1663 ml of a 1.834 mol/liter aqueous ferrous sulfate solution was added to and mixed with the sodium dihydrogenphosphate solution obtained by dissolving 8.66 g of sodium dihydrogenphosphate in 300 ml of water. Water was further added until the total volume reached 2,700 ml.

Lepidocrocite particles were then produced.

After 2,000 ml of water charged into a bubble column (reactor) having an effective capacity of 5 liter was heated to 40° C., air was passed into the water at a rate of 15 liter/min. Thereafter, a 0.1-N NaOH solution was added so as to adjust the pH value to 8. Immediately after the pH value was adjusted, the solution A which had been aged at 35° C. for 30 minutes was charged into the reactor at a rate of 45 ml/min and continued to be charged for 60 minutes. During the time when the solution A was charged, the temperature of the reactor was maintained at 40° C., and a 4.5-N aqueous NaOH solution was intermittently added so as to maintain the pH value of the reaction slurry constantly at about 8. Even after the charging of the solution A was finished, air was continuously passed into the slurry under stirring, and the temperature was maintained at 40° C. and the pH value at 8. 4.5 hours after the start of reaction, an orange precipitate was obtained.

Figure 2:
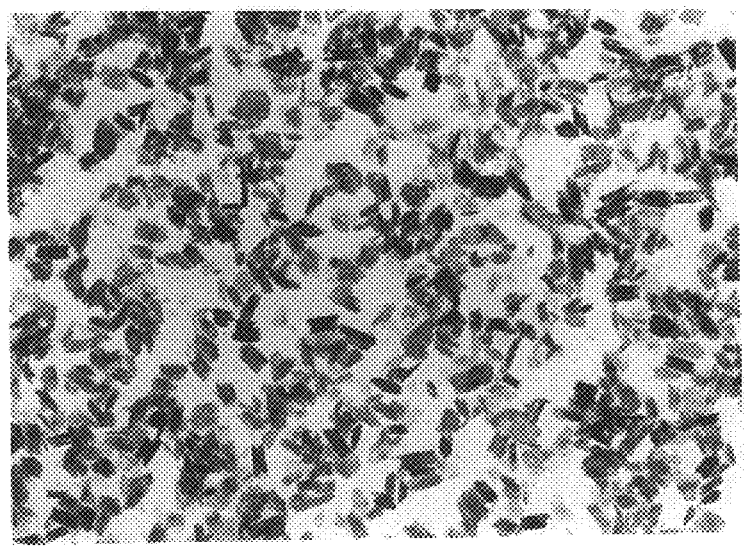
FIG. 2 is an electron micrograph (×30,000) showing the rectangular parallelopipedic lepidocrocite particles obtained in an Example 1.

After the orange precipitate obtained was filtered out and washed with water by an ordinary method, it was dried at 80° C. for 24 hours and a dried product was thus obtained. The yield was 12.04 kg/m³·hour. The dried product proved to be lepidocrocite particles, as shown in the X-ray diffraction diagram shown in FIG. 1. In FIG. 1, the peak A indicates lepidocrocite (γ-FeOOH). The lepidocrocite particles were particles having a rectangular parallelopipedic shape, as shown in the electron micrograph (×30,000) shown in FIG. 2. The minor axial diameter thereof was 0.057 µm, the major axial diameter was 0.12 µm, the thickness was 0.017 µm, and the major axial diameter the minor axial diameter was 2.1:1. The geometrical standard deviation σg of the major axial diameter was 1.38, which represented an excellent particle size distribution. The amount of soluble $SO_4$ was 52 ppm.

EXAMPLE 2

The following solutions B and C were prepared in advance and charged into different chambers at 35° C.

Solution B:

1091 ml of a 1.834 mol/liter aqueous ferrous sulfate solution was added to and mixed with the sodium dihydrogenphosphate solution obtained by dissolving 5.68 g of sodium dihydrogenphosphate in 300 ml of water. Water was further added until the total volume reached 1,500 ml.

Solution C:

572 ml of a 1.834 mol/liter aqueous ferrous sulfate solution was added to and mixed with the sodium dihydrogenphosphate solution obtained by dissolving 2.98 g of sodium dihydrogenphosphate in 150 ml of water. Water was further added until the total volume reached 1,000 ml.

Lepidocrocite particles were then produced in the presence of seed crystals.

After 2,000 ml of water charged into a bubble column (reactor) having an effective capacity of 5 liter was heated to 35° C., the solution C which had been aged at 35° C. for 30 minutes was charged into the reactor while air was passed into the water at a rate of 10 liter/min, and the mixture was stirred by air which was passing into the bubble column for 5 minute.

An aqueous NaOH solution having a temperature of 35° C. which had been prepared in advance (91 ml of a 18.4-N aqueous NaOH solution was diluted with water so that the total volume was 500 ml, which was 0.8 equivalent to Fe contained in the solution C) was added to the reactor in limited amounts. After the end of addition, air was further passed into the solution at a rate of 10 liter/min under stirring for 5 minutes. Thus, seed crystals were produced.

The liquid in the reactor was heated to 40° C. while air was consecutively passed thereinto at a rate of 10 liter/minute under stirring, and a small amount of a 4.5-N NaOH solution was then added so as to adjust the pH value to 8. Immediately after the pH value was adjusted, the solution B which had been aged at 35° C. for 30 minutes was charged into the reactor at a rate of 25 ml/min and continued to be charged for 60 minutes. During the period when the solution B was charged, the temperature of the reactor was maintained at 40° C., and a 4.5-N aqueous NaOH solution was intermittently added so as to maintain the pH value of the reaction slurry constantly at about 8. Even after the charging of the solution B was finished, air was continuously passed into the slurry, and the temperature thereof was maintained at 40° C. and the pH value at 8. 8.3 hours after the start of reaction, an orange precipitate was obtained.

After the orange precipitate obtained was filtered out and washed with water by an ordinary method, it was dried at 80° C. for 24 hours and a dried product was thus obtained. The yield was 6.53 kg/m$^3$·hour. In the X-ray diffraction of the dried product, only lepidocrocite particles were observed. When the lepidocrocite particles were observed under an electron microscope, they had a rectangular parallelopipedic shape. The minor axial diameter was 0.045 $\mu$m, the major axial diameter was 0.090 $\mu$m, the thickness was 0.017 $\mu$m, and the aspect ratio was 2.0:1. The geometrical standard deviation $\sigma g$ of the axial diameter was 1.32, which represented an excellent particle size distribution. The amount of soluble $SO_4$ was 90 ppm.

EXAMPLES 3 TO 5, COMPARATIVE EXAMPLES 1 TO 7

Production of particles

The reaction product was obtained in the same way as in Example 1 except for varying the kind, concentration and amount of aqueous ferrous salt, the kind and amount of phosphorus compound and/or citric compound, the kind and concentration of an aqueous alkali solution, the method of mixing materials, and the pH value and temperature during mixing and reaction.

The particles obtained in Examples 3 to 5 and Comparative Examples 4 and 6 were proved to be only lepidocrocite particles as a result of X-ray diffraction.

On the other hand, it was judged from the result of X-ray diffraction that the reaction products obtained in Comparative Examples 1, 3 and 5 were contained magnetite ($\underline{FeO}_x \cdot Fe_2O_3$, $0<x\leq1$) particles as well as lepidocrocite particles.

Figure 3:
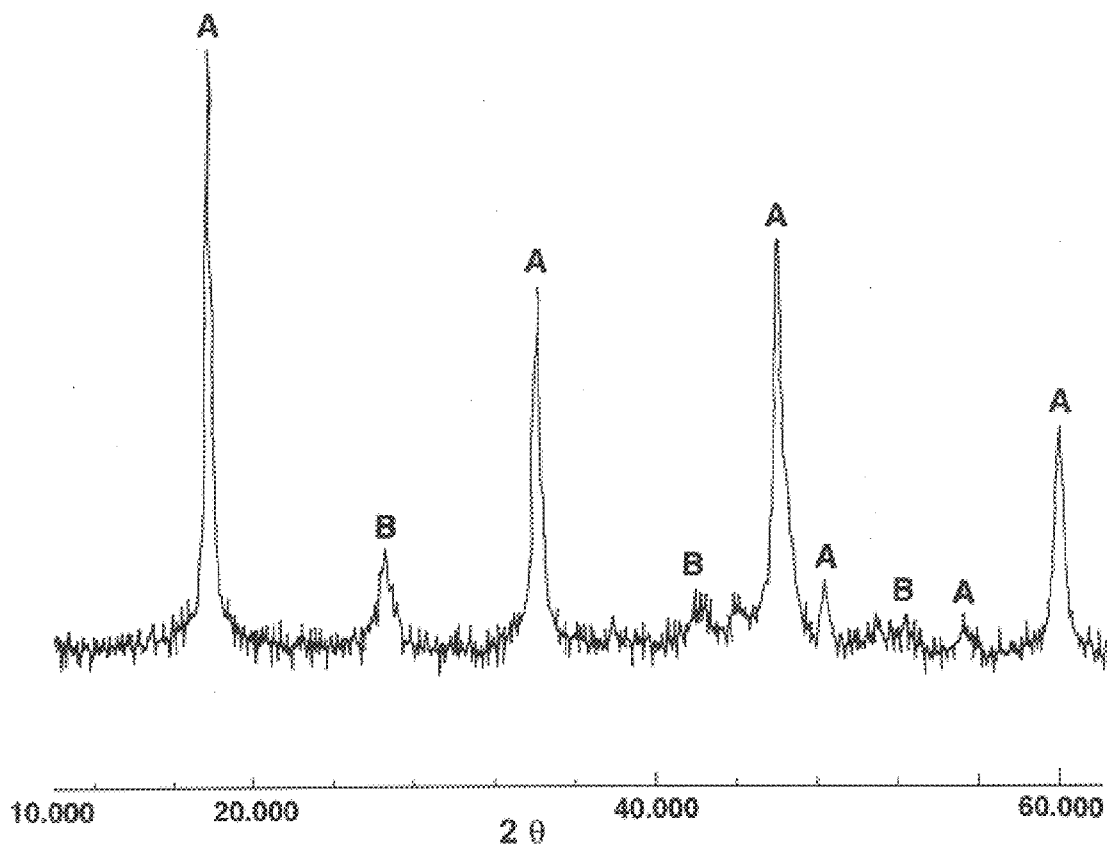
FIG. 3 shows a pattern obtained by the X-ray diffraction of the reaction product obtained in Comparative Example 2.
Figure 4:
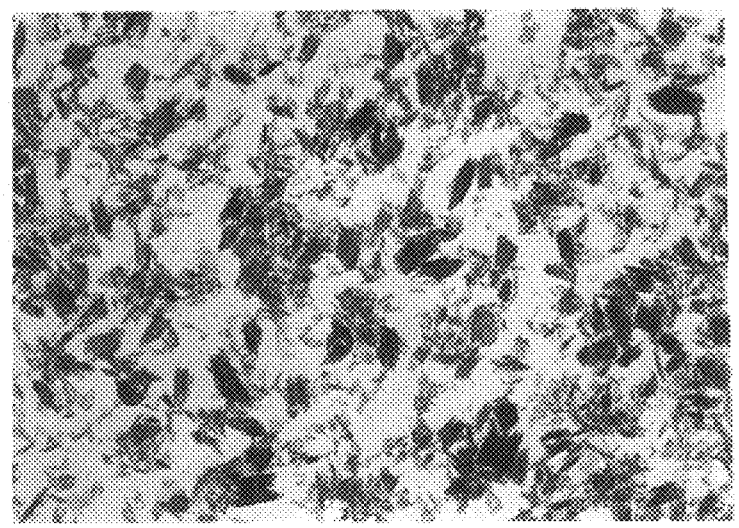
FIG. 4 is an electron micrograph (×30,000) showing the particle obtained in Comparative Example 2.

The X-ray diffraction diagram and the electron micrograph (×30,000) of the reaction product obtained in Comparative Example 2 are shown in FIGS. 3 and 4, respectively. In FIG. 3, the peak A represents lepidocrocite and the peak B represents goethite ($\alpha$-FeOOH). That is, it was observed that goethite particles were mixed with lepidocrocite particles. As shown in FIG. 4, there were rectangular parallelopipedic particles and acicular particles in a mixed state.

Figure 5:
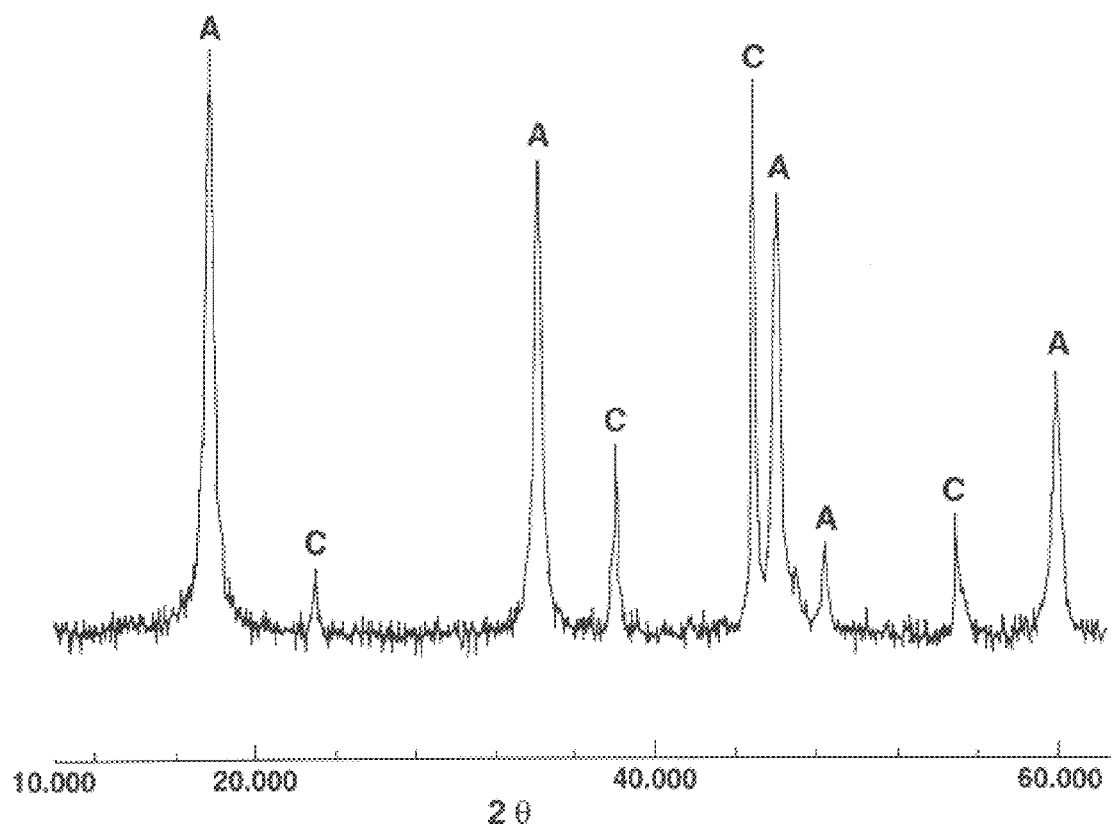
FIG. 5 shows a pattern obtained by the X-ray diffraction of the reaction product obtained in Comparative Example 7.
Figure 6:
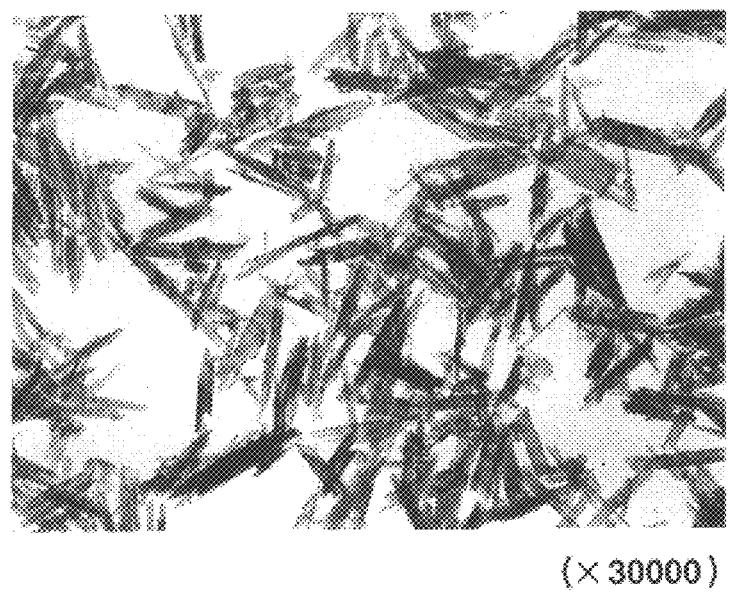
FIG. 6 is an electron micrograph (×30,000) showing the particle product obtained in Comparative Example 7.

The X-ray diffraction diagram and the electron micrograph (×30,000) of the reaction product obtained in Comparative Example 7 are shown in FIGS. 5 and 6, respectively. In FIG. 5, the peak A represents lepidocrocite and the peak C represents magnetite. That is, it was observed that magnetite particles were mixed with lepidocrocite particles. As shown in FIG. 6, there were rectangular parallelopipedic particles and granular particles in a mixed state.

The main producing conditions are shown in Table 1 and various properties are shown in Table 2.

EXAMPLES 6 TO 8, COMPARATIVE EXAMPLE 8

The reaction product was obtained in the same way as in Example 2 except for varying the concentration and amount of aqueous ferrous salt, the kind and amount of phosphorus compound and/or citric compound, the kind and concentration of an aqueous alkali solution, the method of mixing materials, the kind and amount of seed crystal, and the pH value and temperature during mixing and reaction.

The particles obtained in Examples 6 to 8 and Comparative Example 8 was proved to be only lepidocrocite particles as a result of X-ray diffraction.

Figure 7:
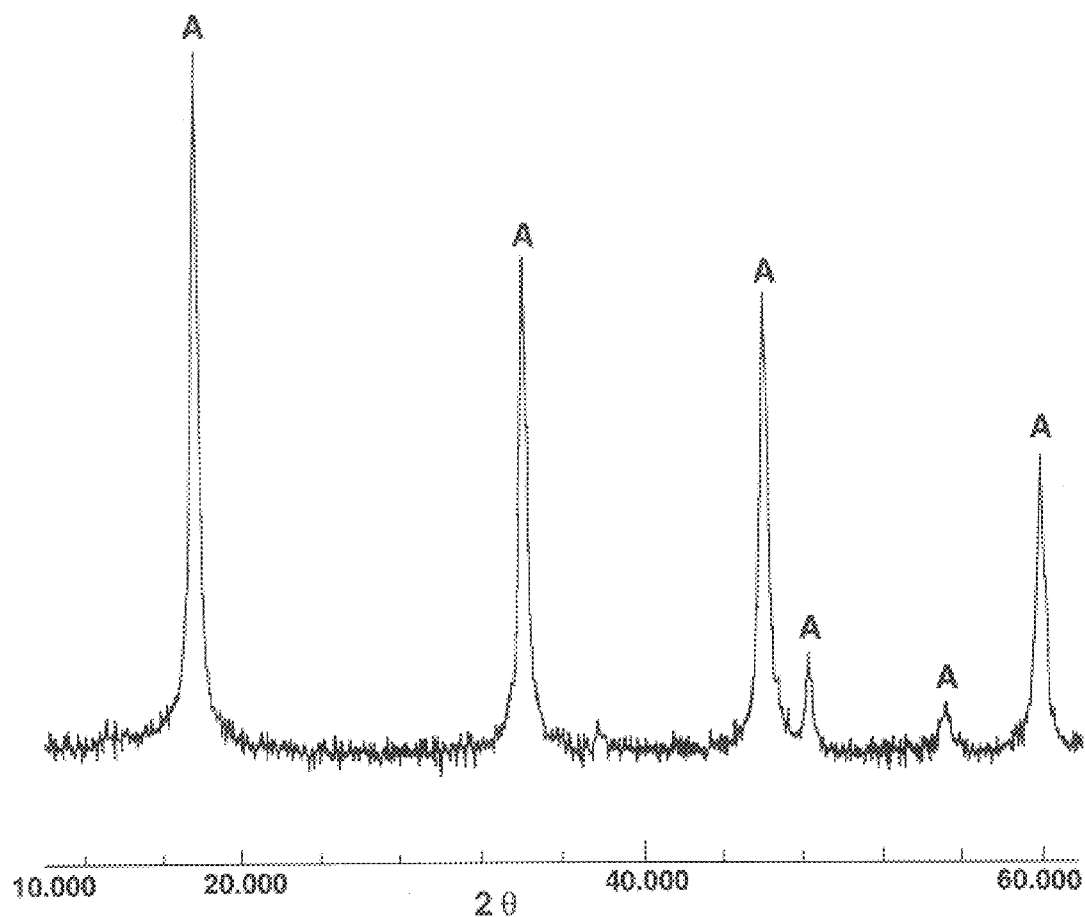
FIG. 7 shows a pattern obtained by the X-ray diffraction of rectangular parallelopipedic lepidocrocite particles obtained in Example 7.
Figure 8:
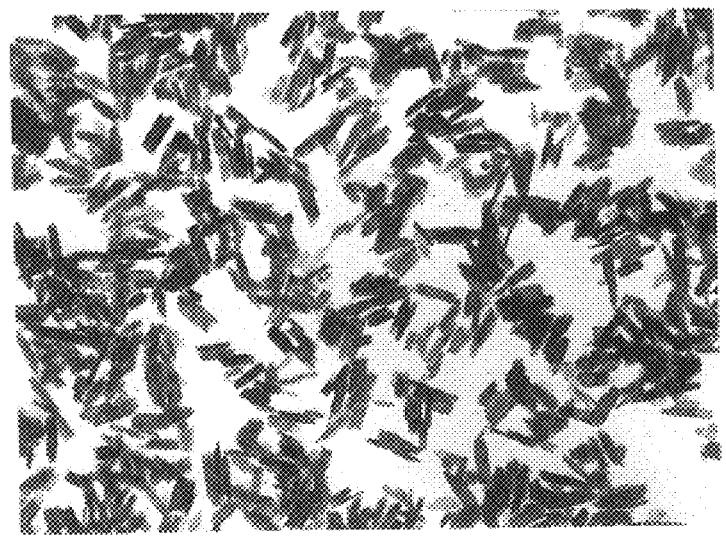
FIG. 8 is an electron micrograph (×30,000) showing the rectangular parallelopipedic lepidocrocite particles obtained in Example 7.
Figure 9:
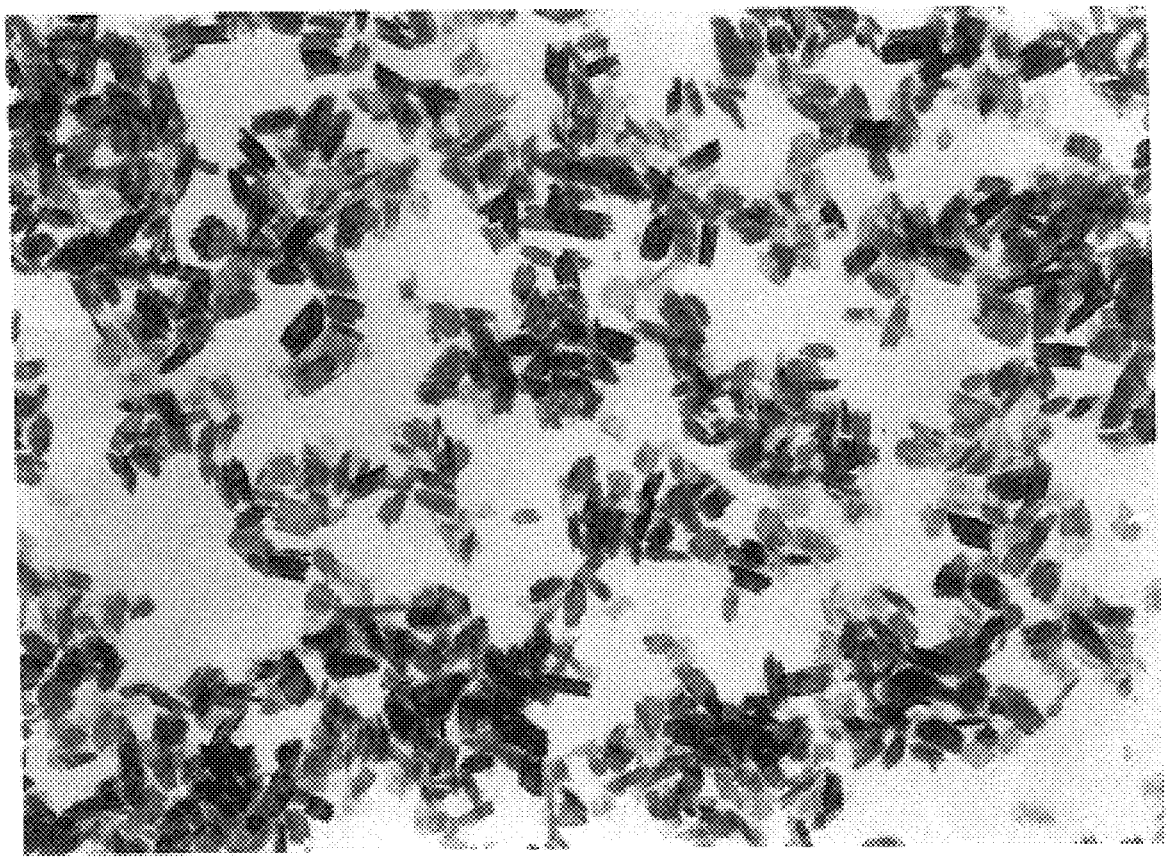
FIG. 9 is an electron micrograph (×30,000) showing the rectangular parallelopipedic lepidocrocite particles obtained in Example 50.

The X-ray diffraction diagram and the electron micrograph (×30,000) of the reaction product obtained in Example 7 are shown in FIGS. 7 and 8, respectively. In FIG. 7, the peak A represents lepidocrocite. That is, the reaction product in Example 7 was proved to be only lepidocrocite particles.

The main producing conditions are shown in Table 6 and various properties are shown in Table 7.

The lepidocrocite particles obtained in Comparative Example 8 were judged to be acicular particles from the result of observation under an electron microscope.

EXAMPLE 9

Production of solvent-based paint 10 g of the lepidocrocite particles obtained in Example 1, an aminoalkyd resin and a thinner were mixed in the following ratio, and the obtained mixture was charged into a 140-ml glass pot together with 90 g of glass beads of 3 mm in diameter. The slurry (obtained mixture) was mixed and dispersed by a paint shaker for 90 minutes so as to produce a mill base.

| | |
|---|---|
| Lepidocrocite particles | 12.2 parts by weight |
| Aminoalkyd resin | 19.5 parts by weight |
| (Amilac No. 1026, produced by Kansai Paint Co., Ltd.) | |
| Thinner | 7.3 parts by weight |

The mill base obtained and an aminoalkyd resin were mixed in the following ratio, and the obtained mixture was charged into a 140-ml glass container. The slurry was mixed and dispersed by a paint shaker for 15 minutes so as to produce a solvent-based paint.

| | |
|---|---|
| Mill base | 39.0 parts by weight |
| Aminoalkyd resin | 61.0 parts by weight |
| (Amilac No. 1026, produced by Kansai Paint Co., Ltd.) | |

The tinting strength and the hiding power of the lepidocrocite particles measured by using the paint obtained were 5 and 18, respectively.

The paint obtained was applied to a standard test sheet (150 mm (length)×70 mm (width)×0.8 mm (thickness), JIS G 3141, cold-rolled steel sheet, produced by Nihon Test Panel Osaka, Co., Ltd.) by using an applicator, and after air-drying, the paint was baked at 120° C. for 30 minutes.

The gloss of the coated surface of the coated piece was 89%, the hue was orange, and the a* value was 23.3, the b* value was 37 and the L* value was 51.4.

EXAMPLE 10

Production of water-based paint 7.62 g of the lepidocrocite particles obtained in Example 1, an water-soluble alkyd resin, an anti-foaming agent and water were mixed in the following ratio, and the obtained mixture was charged into a 140-ml glass pot together with 90 g of glass beads of 3 mm in diameter. The slurry (obtained mixture) was mixed and dispersed by a paint shaker for 90 minutes to produce a mill base.

| | |
|---|---|
| Lepidocrocite particles | 12.4 parts by weight |
| Water-soluble alkyd resin (S-118, produced by Dai Nippon Ink & Chemicals, Inc.) | 9.0 parts by weight |
| Anti-foaming agent (Nopuco 8034, produced by Sun-Nopuco Co., Ltd.) | 0.1 part by weight |
| Water | 4.8 parts by weight |
| Butyl cellosolve | 4.1 parts by weight |

The mill base obtained and a water-soluble alkyd resin, a water-soluble melamine resin, an anti-foaming agent and water were mixed in the following ratio, and the obtained mixture was charged into a 140-ml glass pot. The slurry (obtained mixture) was mixed and dispersed by a paint shaker for 15 minutes so as to produce a water-based paint.

| | |
|---|---|
| Mill substrate | 30.4 parts by weight |
| Water-soluble alkyd resin (S-118, produced by Dai Nippon Ink & Chemicals, Inc.) | 46.2 parts by weight |
| Water-soluble melamine resin (S-695, produced by Dai Nippon Ink & Chemicals, Inc.) | 12.6 parts by weight |
| Anti-foaming agent (Nopuco 8034, produced by Sun-Nopuco Co., Ltd.) | 0.1 part by weight |
| Water | 9.1 parts by weight |
| Butyl cellosolve | 1.6 parts by weight |

The tinting strength and the hiding power of the lepidocrocite particles measured by using the paint obtained were 5 and 21, respectively.

A coated piece was obtained by using this paint in the same way as in Example 9.

The gloss of the coated surface of the thus-obtained coated piece was 83%, the hue was orange, and the a* value was 23.1, the b* value was 35.2 and the L* value was 48.6.

EXAMPLE 11

Production of resin composition 1.5 g of the lepidocrocite particles obtained in Example 1 and 48.5 g of a polyvinyl chloride resin (103EP8D, produced by Japanese Geon Co., Ltd.) were charged into a 100-cc polyethylene beaker and adequately mixed with a spatula.

0.5 g of calcium stearate was added to the thus-obtained mixture of the lepidocrocite particles and the polyvinyl chloride resin, and they were further mixed. The obtained mixture was then gradually kneaded by a roll mill (the clearance was set at 0.2 mm) which was heated to 160° C. until the mixture became uniform. A resin composition was thus produced.

The resin composition was peeled off the roll and inserted between stainless steel plates (200 mm×200 mm, clearance: 1 mm) with the surfaces polished. The stainless sheets were press molded under a pressure of 1 ton/cm$^2$ by a hot press which was heated to 180° C., and a colored resin plate having a thickness of 1 mm was obtained.

The dispersion state of the colored resin plate was visually judged to be 5. The hue was orange, and the a* value was 25.5, the b* value was 31.6 and the L* value was 46.8.

EXAMPLES 12 TO 16, COMPARATIVE EXAMPLES 9 TO 15

Production of solvent-based paint

Solvent-based paints were produced in the same way as in Example 9 except for varying the kind of particles.

The main producing conditions and various properties are shown in Table 3.

EXAMPLES 17 TO 21, COMPARATIVE EXAMPLES 16 TO 22

Production of water-based paint

Water-based paints were produced in the same way as in Example 10 except for varying the kind of particles.

The main producing conditions and various properties are shown in Table 4.

EXAMPLES 22 TO 26, COMPARATIVE EXAMPLES 23 TO 29

Production of resin composition

Resin compositions were produced in the same way as in Example 11 except for varying the kind of particles.

The main producing conditions and various properties are shown in Table 5.

EXAMPLES 27 TO 33, COMPARATIVE EXAMPLE 30

Production of solvent-based paint

Solvent-based paints were produced in the same way as in Example 9 except for varying the kind of particles.

Various properties of the paints are shown in Table 8.

EXAMPLES 34 to 40, COMPARATIVE EXAMPLE 31

Production of water-based paint

Water-based paints were produced in the same way as in Example 10 except for varying the kind of particles.

Various properties of the paints are shown in Table 9.

EXAMPLES 41 TO 47, COMPARATIVE EXAMPLE 32

Production of resin composition

Resin compositions were produced in the same way as in Example 11 except for varying the kind of particles.

Various properties of the resin compositions are shown in Table 10.

EXAMPLE 48

Production of non-magnetic undercoat layer 12 g of the lepidocrocite particles obtained in Example 1, a binder resin solution (30 wt % of a vinyl chloride-vinyl acetate copolymer resin having a sodium sulfonate group and 70 wt % of cyclohexanone) and cyclohexanone were mixed and the obtained mixture (solid content: 72 wt %) was kneaded by a plast mill for 30 minutes.

The kneaded material was taken out, charged into a 140-ml glass pot together with 95 g of glass beads of 1.5 mm in diameter, a binder resin solution (30 wt % of a polyurethane resin having a sodium sulfonate group and 70 wt % of a solvent (methyl ethyl ketone:toluene=1:1)), cyclohexanone, methyl ethyl ketone and toluene, and mixed and dispersed by a paint shaker for 6 hours, thereby producing a non-magnetic coating material.

The composition of the thus-obtained non-magnetic coating material was as follows:

| | |
|---|---|
| Lepidocrocite particles | 100 parts by weight |
| Vinyl chloride-vinyl acetate copolymer resin having a sodium sulfonate group | 10 parts by weight |
| Polyurethane resin having a sodium sulfonate group | 10 parts by weight |
| Cyclohexanone | 56 parts by weight |
| Methyl ethyl ketone | 140 parts by weight |
| Toluene | 84 parts by weight |

The non-magnetic coating material obtained was applied to a polyethylene terephthalate film having 12 $\mu$m in thickness to a thickness of 55 $\mu$m by an applicator, and the obtained film was then dried, thereby forming a non-magnetic undercoat layer. The thickness of the non-magnetic undercoat layer was 3.5 $\mu$m. The thickness of the substrate was 15.5 $\mu$m.

The gloss at 45° of the non-magnetic undercoat layer was 143%, the surface roughness Ra was 5.9 nm, and the Young's modulus (relative value) was 125.

EXAMPLE 49

Production of magnetic recording layer 12 g of acicular magnetic iron-based alloy particles (composition: 70.6 wt % of Fe, 5.1 wt % of Co, 6.0 wt % of Nd, and 3.3 wt % of Al; average major axial diameter: 0.15 $\mu$m, average minor axial diameter: 0.022 $\mu$m, aspect ratio: 6.8; coercive force: 1690 Oe, saturation magnetization: 131 emu/g), 1.2 g of a polishing agent (AKP-30, trade name, produced by Sumitomo Chemical Co., Ltd.), 0.36 g of carbon black (#3250B, trade name, produced by Mitsubishi Chemical Corp.), a binder resin solution (30 wt % of a vinyl chloride-vinyl acetate copolymer resin having a sodium sulfonate group and 70 wt % of cyclohexanone) and cyclohexanone were mixed and the mixture (solid content: 78 wt %) was kneaded by a blast mill for 30 minutes.

The kneaded material was then taken out, charged into a 140-ml glass pot together with 95 g of glass beads of 1.5 mm in diameter, a binder resin solution (30 wt % of a polyurethane resin having a sodium sulfonate group and 70 wt % of a solvent (methyl ethyl ketone:toluene=1:1)), cyclohexanone, methyl ethyl ketone and toluene, and mixed and dispersed by a paint shaker for 6 hours, thereby producing a magnetic coating material.

A lubricant and a curing agent were further added, and the mixture was further mixed and dispersed for 15 minutes.

The composition of the thus-obtained magnetic coating was as follows:

| | |
|---|---|
| Magnetic iron-based alloy particles | 100 parts by weight |
| Vinyl chloride-vinyl acetate copolymer resin having a sodium sulfonate group | 10 parts by weight |
| Polyurethane resin having a sodium sulfonate group | 10 parts by weight |
| Polishing agent (AKP-30, produced by Sumitomo Chemical Co., Ltd.) | 10 parts by weight |
| Carbon black (3250B, produced by Mitsubishi Chemical Corporation) | 3 parts by weight |
| Lubricant (myristic acid: butyl stearate = 1:2) | 3 parts by weight |
| Curing agent (polyisocyanate) | 5 parts by weight |
| Cyclohexanone | 65.8 parts by weight |
| Methyl ethyl ketone | 164.5 parts by weight |
| Toluene | 98.7 parts by weight |

The magnetic coating obtained was applied to the non-magnetic undercoat layer obtained in Example 48 to a thickness of 15 $\mu$m by an applicator, and the magnetic recording medium obtained was oriented and dried in a magnetic field, and then calendered. The magnetic recording medium was then subjected to a curing reaction at 60° C. for 24 hours, and thereafter slit into a width of 0.5 inch, thereby obtaining a magnetic tape. The thickness of the magnetic recording medium was 16.7 $\mu$m and the thickness of the magnetic recording layer was 1.2 $\mu$m.

The magnetic tape obtained had a coercive force Hc of 1893 Oe, a squareness of 0.86, a gloss at 45° of 225%, a surface roughness Ra of 6.7 nm and a Young's modulus (relative value) of 138.

COMPARATIVE EXAMPLES 33 TO 35

Three types of non-magnetic particles were prepared as the non-magnetic particles for a non-magnetic undercoat layer.

The non-magnetic particles in Comparative Example 33 were acicular hematite particles having a minor axial diameter of 0.046 $\mu$m, a major axial diameter of 0.36 $\mu$m and an aspect ratio of 7.8:1. The geometrical standard deviation of the major axial diameter was 1.45 and the soluble $SO_4$ content was 1832 ppm.

The non-magnetic particles in Comparative Example 34 were granular hematite particles having an average particle size of 0.30. The geometrical standard deviation of the major axial diameter was 1.38 and the soluble $SO_4$ content was 56 ppm.

The non-magnetic particles in Comparative Example 35 were acicular goethite particles having a minor axial diameter of 0.052 $\mu$m, a major axial diameter of 0.44 $\mu$m and an aspect ratio of 8.5:1. The geometrical standard deviation of the major axial diameter was 1.43 and the soluble $SO_4$ content was 568 ppm.

EXAMPLE 50

Surface coating of particles

The orange precipitate obtained in Example 4 was filtered out by an ordinary method and washed with water until the electric conductivity of the filtrate became not more than 100 μS. The wet cake obtained was peptized again in water, and the concentration was adjusted so as to obtain a slurry of 50 g/liter.

2 liter of the slurry was heated to 60° C. under stirring, and 185 ml (equivalent to 5.0 wt % (calculated as Al) based on the lepidocrocite particles) of a 1-N sodium aluminate solution was gradually added thereto. 30 minutes after the slurry was continuously stirred, 5 wt % of an aqueous acetic acid solution was added so as to adjust the pH value to 7.0. The slurry was filtered through a Buchner funnel, washed with water and dried at 80° C. for 24 hours so as to obtain a dried product.

The thus-obtained lepidocrocite particles were rectangular parallelopipedic particles, as shown in the electron micrograph (×30,000) in FIG. 5, and had a major axial diameter of 0.11 μm, a minor axial diameter of 0.051 μm, a thickness of 0.014 μm and an aspect ratio of 2.16:1.0. The geometrical standard deviation of the major axial diameter σg was 1.56, the soluble $SO_4$ content was 76 ppm and the amount of Al hydroxide coating the particle surfaces was 4.93 wt % (calculated as Al).

EXAMPLES 51 TO 54

Particles with the surfaces coated with a coating material was obtained in the same way as in Example 50 except for varying the kind of orange precipitate, and the kind and the amount of coating compound.

The main producing conditions and various properties are shown in Table 11.

EXAMPLE 55

Production of non-magnetic undercoat layer

A coating composition for a non-magnetic undercoat layer was produced in the same way as in Example 48 except for using the rectangular parallelopipedic lepidocrocite particles obtained in Example 1 as the non-magnetic particles.

The thus-obtained non-magnetic coating composition was applied to a polyethylene terephthalate film of 12 μm thick to a thickness of 55 μm by an applicator, and the film was then dried, thereby forming a non-magnetic undercoat layer. The thickness of the non-magnetic undercoat layer was 3.9 μm. The thickness of the substrate was 15.9 μm.

The gloss of the non-magnetic undercoat layer was 131%, the surface roughness Ra was 6.7 nm, and the Young's modulus (relative value) was 121.

EXAMPLES 56 TO 67, COMPARATIVE EXAMPLES 36 TO 40

Non-magnetic undercoat layers were formed on polyethylene terephthalate films in the same way as in Example 55 except for varying the kind of non-magnetic particles.

The main producing conditions and various properties are shown in Tables 12 and 13.

EXAMPLE 68

Production of magnetic recording layer

A magnetic coating material obtained in the same way as in Example 49 were applied to the non-magnetic undercoat layer of the substrate obtained in Example 56 to a thickness of 15 μm by using an applicator and the magnetic recording medium obtained was oriented in a magnetic field and dried, and then calendered. The magnetic recording medium was then subjected to a curing reaction at 60° C. for 24 hours, and thereafter slit into a width of 0.5 inch, thereby obtaining a magnetic recording medium. The thickness of the magnetic recording medium was 16.9 μm and the thickness of the magnetic recording layer was 1.1 μm.

The magnetic recording medium obtained had a coercive force Hc of 1775 Oe, a squareness of 0.86, a gloss of 198%, a surface roughness Ra of 6.4 nm and a Young's modulus (relative value) of 120.

EXAMPLES 69 TO 79, COMPARATIVE EXAMPLES 41 TO 45

Recording media were obtained in the same way as in Example 68 except for varying the kinds of non-magnetic undercoat layer and magnetic particles.

In Examples 71, and 75 to 79, Comparative Examples 41 to 45, the same acicular magnetic iron-based alloy particles as those in Example 68 were used as the magnetic particles.

In Examples 69, 70 and 72, acicular magnetite particles (major axial diameter: 0.16 μm, minor axial diameter: 0.023 μm, aspect ratio: 7.0:1, coercive force Hc: 888 Oe, saturation magnetization: 81.8 emu/g) with the surfaces coated with Co (4.78 wt % calculated as Co) were used as the magnetic particles.

In Examples 73 and 74, acicular maghemite particles (major axial diameter: 0.20 μm, minor axial diameter: 0.033 μm, aspect ratio: 6.1:1, coercive force Hc: 837 Oe, saturation magnetization: 77.8 emu/g) with the surfaces modified with Co (4.23 wt % calculated as Co) were used as the magnetic particles.

The main producing conditions and various properties are shown in Tables 14 and 15.

TABLE 1

| | Production of lepidocrocite particles | | | | |
|---|---|---|---|---|---|
| Examples | Aqueous ferrous sulfate | | | Phosphorus compound, citric compound | |
| and Comparative Examples | Kind | Concentration (mol/l) | Amount (l) | Kind | Amount (mol %) |
| Example 3 | FeSO$_4$ | 1.834 | 2.181 | Orthophosphoric acid | 3.0 |
| Example 4 | FeSO$_4$ | 1.834 | 1.527 | Sodium hydrogencitrate | 5.0 |
| Example 5 | FeSO$_4$ | 1.834 | 0.818 | Trisodium phosphate | 0.5 |
| Comp. Example 1 | FeSO$_4$ | 1.834 | 1.365 | — | — |
| Comp. Example 2 | FeSO$_4$ | 1.834 | 1.365 | Disodium hydrogenphosphate | 1.0 |
| Comp. Example 3 | FeSO$_4$ | 1.834 | 1.365 | — | — |
| Comp. Example 4 | FeCl$_2$ | 2.0 | 1.0 | — | — |
| Comp. Example 5 | FeSO$_4$ | 1.80 | 0.180 | — | — |
| Comp. Example 6 | FeSO$_4$ | 1.834 | 0.241 | Disodium hydrogenphosphate | 2.0 |
| Comp. Example 7 | FeSO$_4$ | 1.834 | 2.230 | Disodium hydrogenphosphate | 1.0 |

TABLE 1-continued

Production of lepidocrocite particles

| Ex. and Comp. Ex. | Aqueous alkali hydroxide Kind | Concentration (N) | Mixing method Adding method | Aging time (min) | Adding time (min) | Amount of solution A (ml) |
|---|---|---|---|---|---|---|
| Ex. 3 | NaOH | 4.5 | (2) | 60 | — | 2700 |
| Ex. 4 | NaOH | 4.5 | (3) | — | 120 | 2700 |
| Ex. 5 | NaOH | 4.5 | (4) | — | — | 2700 |
| Comp. Ex. 1 | NaOH | 4.5 | (4) | — | — | 2700 |
| Comp. Ex. 2 | NaOH | 4.5 | (4) | — | — | 2700 |
| Comp. Ex. 3 | KOH | 6.0 | (3) | — | 60 | 2700 |
| Comp. Ex. 4 | NH$_4$OH | 2.0 | (4) | — | — | 2700 |
| Comp. Ex. 5 | NH$_4$OH | 2.0 | (4) | — | — | 2700 |
| Comp. Ex. 6 | NaOH | 0.75 | (4) | — | — | 2700 |
| Comp. Ex. 7 | NaOH | 4.5 | — | — | — | 2700 |

Production of lepidocrocite particles

| Examples and Comparative Examples | During mixing and reaction pH value (-) | Temperature (°C.) | Oxidation Time (h) | Yield (kg/min · Hr) |
|---|---|---|---|---|
| Example 3 | 8.0 | 35 | 7.6 | 9.35 |
| Example 4 | 8.5 | 30 | 3.2 | 15.55 |
| Example 5 | 7.2 | 27 | 6.2 | 4.30 |
| Comp. Example 1 | 8.0 | 40 | 2.6 | — |
| Comp. Example 2 | 5.0 | 40 | 4.8 | — |
| Comp. Example 3 | 10.0 | 40 | 3.2 | — |
| Comp. Example 4 | 7.6 | 10 | 48.0 | 0.74 |
| Comp. Example 5 | 6.5 | 15 | 0.5 | — |
| Comp. Example 6 | 4.0 | 45 | 26.8 | 0.29 |
| Comp. Example 7 | 10.8 | 50 | 2.3 | — |

Note: Adding method (1) A phosphorus compound and/or a citric compound is added to and mixed with an aqueous ferrous salt solution and the mixture is aged. The aged mixture is continuously charged into a reactor and an aqueous alkali is charged into the reaction simultaneously and in parallel therewith.

(2) A phosphorus compound and/or a citric compound is added to and mixed with an aqueous ferrous salt solution and the mixture is aged. The aged mixture and an aqueous alkali are simultaneously charged into a reactor at one time.

(3) An aqueous ferrous salt solution, a phosphorus compound and/or a citric compound and an aqueous alkali are charged into a reactor simultaneously and in parallel with each other continuously and slowly.

(4) An aqueous ferrous salt solution, a phosphorus compound and/or a citric compound and an aqueous alkali are simultaneously charged into a reactor at one time.

TABLE 2

Lepidocrocite particles

| Ex. and Comp. Ex. | Shape of γ-FeOOH particles | Minor axial diameter (μm) | Major axial diameter (μm) | Thickness (μm) | Aspect ratio |
|---|---|---|---|---|---|
| Ex. 3 | Rectangular parallelopipedic | 0.053 | 0.13 | 0.0083 | 2.45 |
| Ex. 4 | Rectangular parallelopipedic | 0.050 | 0.11 | 0.013 | 2.04 |
| Ex. 5 | Rectangular parallelopipedic | 0.073 | 0.35 | 0.035 | 4.79 |
| Comp. Ex. 1 | Acicular | 0.050 | 0.83 | — | 16.6 |
| Comp. Ex. 2 | Plate | 0.11 | (0.17) | — | 1.55 |
| Comp. Ex. 3 | Acicular | 0.058 | 0.60 | — | 10.3 |
| Comp. Ex. 4 | Acicular | 0.20 | 1.68 | — | 8.4 |
| Comp. Ex. 5 | Acicular | 0.046 | 0.50 | — | 10.9 |
| Comp. Ex. 6 | Acicular | 0.055 | 0.41 | — | 7.45 |
| Comp. Ex. 7 | Acicular | 0.047 | 0.36 | — | 7.66 |

Lepidocrocite particles

| Ex. and Comp. Ex. | Geometrical standard deviation (σg) | SO$_4$ content (ppm) | Hue a* value | b* value | L* value |
|---|---|---|---|---|---|
| Ex. 3 | 1.40 | 76 | 22.6 | 36.6 | 50.5 |
| Ex. 4 | 1.56 | 83 | 23.8 | 34.3 | 48.5 |
| Ex. 5 | 1.38 | 26 | 19.9 | 38.0 | 55.2 |
| Comp. Ex. 1 | 1.98 | 56 | 23.6 | 11.6 | 36.5 |
| Comp. Ex. 2 | 1.46 | 1101 | 17.8 | 36.6 | 49.9 |
| Comp. Ex. 3 | 1.68 | 21 | 21.5 | 14.0 | 45.2 |
| Comp. Ex. 4 | 1.72 | 30 | 21.3 | 49.3 | 58.1 |
| Comp. Ex. 5 | 1.78 | 586 | 20.5 | 17.0 | 41.6 |
| Comp. Ex. 6 | 1.72 | 1287 | 21.6 | 46.5 | 52.5 |
| Comp. Ex. 7 | 1.56 | 50 | 21.1 | 13.6 | 44.6 |

TABLE 3

| Ex. and Comp. Ex. | Kind of lepidocrocite particles | Solvent-based paint Gloss (%) | Tinting strength (-) | Hiding power (-) | Hue a* value | b* value | L* value |
|---|---|---|---|---|---|---|---|
| Ex. 12 | Ex. 3 | 87 | 5 | 20 | 23.6 | 38.6 | 51.1 |
| Ex. 13 | Ex. 4 | 86 | 4 | 21 | 23.8 | 35.1 | 49.9 |
| Ex. 14 | Ex. 5 | 80 | 4 | 20 | 18.8 | 37.6 | 56.7 |
| Ex. 15 | Ex. 50 | 91 | 5 | 18 | 23.8 | 35.2 | 50.0 |
| Ex. 16 | Ex. 51 | 86 | 5 | 19 | 18.9 | 37.6 | 56.8 |
| Comp. Ex. 9 | Comp. Ex. 1 | 58 | 3 | 31 | 22.1 | 13.6 | 46.8 |
| Comp. Ex. 10 | Comp. Ex. 2 | 63 | 3 | 33 | 16.6 | 36.8 | 50.1 |
| Comp. | Comp. | 73 | 3 | 26 | 20.5 | 16.8 | 45.6 |

TABLE 3-continued

| Ex. and Comp. Ex. | Kind of lepido-crocite particles | Solvent-based paint | | | | | |
|---|---|---|---|---|---|---|---|
| | | Gloss (%) | Tinting strength (-) | Hiding power (-) | Hue a* value | b* value | L* value |
| Ex. 11 Comp. Ex. 12 | Ex. 3 Comp. | 32 | 3 | 41 | 21.2 | 49.2 | 58.9 |
| Comp. Ex. 13 | Comp. Ex. 4 | 65 | 3 | 33 | 18.6 | 18.8 | 43.1 |
| Comp. Ex. 14 | Comp. Ex. 5 | 73 | 3 | 33 | 21.3 | 46.6 | 53.5 |
| Comp. Ex. 15 | Comp. Ex. 6 Ex. 7 | 68 | 3 | 30 | 20.0 | 16.1 | 45.0 |

TABLE 4

| Ex. and Comp. Ex. | Kind of lepido-crocite particles | Water-based paint | | | | | |
|---|---|---|---|---|---|---|---|
| | | Gloss (%) | Tinting strength (-) | Hiding power (-) | Hue a* value | b* value | L* value |
| Ex. 17 | Ex. 3 | 82 | 5 | 22 | 22.1 | 36.9 | 50.1 |
| Ex. 18 | Ex. 4 | 80 | 4 | 23 | 23.9 | 35.1 | 48.7 |
| Ex. 19 | Ex. 5 | 76 | 4 | 26 | 19.6 | 36.5 | 56.0 |
| Ex. 20 | Ex. 50 | 86 | 5 | 21 | 23.8 | 35.0 | 48.9 |
| Ex. 21 | Ex. 51 | 80 | 5 | 24 | 19.8 | 36.6 | 55.9 |
| Comp. Ex. 16 | Comp. Ex. 1 | 48 | 3 | 34 | 13.8 | 12.1 | 46.1 |
| Comp. Ex. 17 | Comp. Ex. 2 | 56 | 2 | 35 | 37.1 | 34.9 | 49.0 |
| Comp. Ex. 18 | Comp. Ex. 3 | 68 | 3 | 30 | 16.5 | 16.6 | 44.8 |
| Comp. Ex. 19 | Comp. Ex. 4 | 33 | 2 | 42 | 49.3 | 49.3 | 57.6 |
| Comp. Ex. 20 | Comp. Ex. 5 | 60 | 3 | 34 | 18.6 | 18.7 | 43.0 |
| Comp. Ex. 21 | Comp. Ex. 6 | 70 | 3 | 33 | 47.2 | 46.3 | 53.0 |
| Comp. Ex. 22 | Comp. Ex. 7 | 65 | 3 | 35 | 17.1 | 16.1 | 44.5 |

TABLE 5

| Ex. and Comp. Ex. | Kind of lepido-crocite particles | Resin composition | | | |
|---|---|---|---|---|---|
| | | Dispersion | Hue a* value | b* value | L* value |
| Ex. 22 | Ex. 3 | 5 | 23.2 | 35.0 | 50.0 |
| Ex. 23 | Ex. 4 | 4 | 24.1 | 34.9 | 47.6 |
| Ex. 24 | Ex. 5 | 4 | 20.8 | 35.4 | 53.9 |
| Ex. 25 | Ex. 50 | 5 | 23.9 | 35.0 | 47.6 |
| Ex. 26 | Ex. 51 | 5 | 21.0 | 35.5 | 54.2 |
| Comp. Ex. 23 | Comp. Ex. 1 | 3 | 14.0 | 11.6 | 34.6 |
| Comp. Ex. 24 | Comp. Ex. 2 | 3 | 37.1 | 33.8 | 48.7 |
| Comp. Ex. 25 | Comp. Ex. 3 | 3 | 16.6 | 16.6 | 45.1 |
| Comp. Ex. 26 | Comp. Ex. 4 | 2 | 49.6 | 48.3 | 56.6 |
| Comp. Ex. 27 | Comp. Ex. 5 | 3 | 18.9 | 18.7 | 41.0 |
| Comp. Ex. 28 | Comp. Ex. 6 | 3 | 48.1 | 45.0 | 51.5 |
| Comp. Ex. 29 | Comp. Ex. 7 | 3 | 17.2 | 12.8 | 44.6 |

TABLE 6

| | Production of lepidocrocite particles | | | | |
|---|---|---|---|---|---|
| | Aqueous ferrous sulfate | | | Phosphorus compound, citric compound | |
| Ex. | Kind | Concentration (mol/l) | Amount (l) | Kind | Amount (mol %) |
| Ex. 2 | FeSO$_4$ | 1.834 | 1.091 | Disodium hydrogen-phosphate | 2.0 |
| Ex. 6 | FeSO$_4$ | 1.834 | 1.091 | Potassium hydrogen-phosphate | 0.5 |
| Ex. 7 | FeSO$_4$ | 1.834 | 0.736 | Ammonium hydrogen-phosphate | 1.0 |
| Ex. 8 | FeSO$_4$ | 1.834 | 1.600 | Sodium hydrogen-phosphate | 1.0 |
| | | | | Sodium hydrogencitrate | 1.0 |
| Comp. Ex. 8 | FeSO$_4$ | 1.834 | 0.446 | Trisodium phosphate | 0.75 |

| | Production of lepidocrocite particles | | | | |
|---|---|---|---|---|---|
| | Aqueous alkali hydroxide | | Mixing method | | |
| Ex. | Kind | Concentration (N) | Adding method | Aging time (min) | Adding time (min) | Amount of solution A (ml) |
| Ex. 2 | NaOH | 4.5 | (1) | 30 | 60 | 1500 |
| Ex. 6 | KOH | 6.0 | (2) | 15 | — | 1500 |
| Ex. 7 | NH$_4$OH | 2.0 | (3) | — | 30 | 1500 |
| Ex. 8 | KOH | 6.0 | (4) | — | — | 2400 |
| Comp. Ex. 8 | NaOH | 5.7 | (4) | — | — | 2700 |

| | Production of lepidocrocite particles | | | | |
|---|---|---|---|---|---|
| | During mixing and reaction | | | | |
| Ex. and Comp. Ex. | Seed crystals | | pH | Oxidation | Yield |
| | Kind | Amount (mol) | value (-) | Temperature (° C.) | Time (h) | (kg/m$^3$ · Hr) |
| Ex. 2 | Iron hydroxide | 1.05 | 8.0 | 40 | 8.3 | 6.53 |
| Ex. 6 | Iron hydroxide | 0.52 | 7.5 | 50 | 6.4 | 7.00 |
| Ex. 7 | Iron hydroxide | 1.65 | 8.0 | 38 | 9.8 | 5.44 |

TABLE 6-continued

| Ex. 8 | Iron hydroxide | 1.05 | 8.8 | 45 | 5.2 | 13.62 |
| Comp. Ex. 8 | γ-FeOOH | 1.34 | 5.3 | 65 | 21.8 | 1.76 |

(Note): Adding method
(1) A phosphorus compound and/or a citric compound is added to and mixed with an aqueous ferrous salt solution and the mixture is aged. The aged mixture is continuously charged in the reactor and an aqueous alkali is charged into simultaneously and in parallel therewith.
(2) A phosphorus compound and/or a citric compound is added to and mixed with an aqueous ferrous salt solution and the mixture is aged. The aged mixture and an aqueous alkaki is simultaneously-charged into a reactor at one time.
(3) An aqueous ferrous salt solution, a phosphorus compound and/or a citric compound and an aqeuous alkali are charged into a reactor simultaneously and in parallel with each other continuously and slowly.
(4) An aqueous ferrous salt solution, a phosphorus compound and/or a citric compound and an aqueous alkali are simultaneously charged into a reactor at one time.

(Note): Adding method (1) A phosphorus compound and/or a citric compound is added to and mixed with an aqueous ferrous salt solution and the mixture is aged. The aged mixture is continuously charged into a reactor and an aqueous alkali is charged into the reaction simultaneously and in parallel therewith.

(2) A phosphorus compound and/or a citric compound is added to and mixed with an aqueous ferrous salt solution and the mixture is aged. The aged mixture and an aqueous alkali are simultaneously-charged into a reactor at one time.

(3) An aqueous ferrous salt solution, a phosphorus compound and/or a citric compound and an aqueous alkali are charged into a reactor simultaneously and in parallel with each other continuously and slowly.

(4) An aqueous ferrous salt solution, a phosphorus compound and/or a citric compound and an aqueous alkali are simultaneously charged into a reactor at one time.

TABLE 7

| Ex. and Comp. Ex. | Shape of γ-FeOOH particles | Minor axial diameter (μm) | Major axial diameter (μm) | Thickness (μm) | Aspect ratio |
|---|---|---|---|---|---|
| Ex. 2 | Rectangular parallelopipedic | 0.045 | 0.090 | 0.017 | 2.00 |
| Ex. 6 | Rectangular parallelopipedic | 0.073 | 0.17 | 0.041 | 2.33 |
| Ex. 7 | Rectangular parallelopipedic | 0.045 | 0.19 | 0.027 | 4.22 |
| Ex. 8 | Rectangular parallelopipedic | 0.060 | 0.10 | 0.020 | 1.67 |
| Comp. Ex. 8 | Acicular | 0.092 | 0.82 | — | 8.91 |

TABLE 7-continued

| Ex. and Comp. Ex. | Geometrical standard deviation (σg) | SO₄ content (ppm) | Hue a* value | Hue b* value | Hue L* value |
|---|---|---|---|---|---|
| Ex. 2 | 1.32 | 90 | 23.8 | 33.6 | 48.3 |
| Ex. 6 | 1.28 | 74 | 21.6 | 37.0 | 52.5 |
| Ex. 7 | 1.35 | 88 | 24.6 | 35.8 | 51.0 |
| Ex. 8 | 1.35 | 94 | 24.6 | 33.9 | 41.6 |
| Comp. Ex. 8 | 2.02 | 886 | 22.8 | 41.3 | 58.6 |

TABLE 8

| Ex. and Comp. Ex. | Kind of lepidocrocite particles | Solvent-based paint | | | | | |
|---|---|---|---|---|---|---|---|
| | | Gloss (%) | Tinting strength (-) | Hiding power (-) | Hue a* value | Hue b* value | Hue L* value |
| Ex. 27 | Ex. 2 | 96 | 5 | 13 | 21.6 | 35.8 | 50.1 |
| Ex. 28 | Ex. 6 | 91 | 5 | 15 | 22.8 | 38.6 | 53.5 |
| Ex. 29 | Ex. 7 | 89 | 5 | 19 | 24.3 | 35.0 | 53.0 |
| Ex. 30 | Ex. 8 | 84 | 5 | 19 | 23.6 | 34.6 | 42.8 |
| Ex. 31 | Ex. 52 | 93 | 5 | 13 | 22.9 | 38.8 | 35.6 |
| Ex. 32 | Ex. 53 | 92 | 5 | 17 | 24.3 | 35.2 | 53.3 |
| Ex. 33 | Ex. 54 | 89 | 5 | 18 | 23.7 | 34.5 | 42.8 |
| Comp. Ex. 30 | Comp. Ex. 8 | 53 | 3 | 36 | 21.6 | 43.2 | 59.1 |

TABLE 9

| Ex. and Comp. Ex. | Kind of lepidocrocite particles | Water-based paint | | | | | |
|---|---|---|---|---|---|---|---|
| | | Gloss (%) | Tinting strength (-) | Hiding power (-) | Hue a* value | Hue b* value | Hue L* value |
| Ex. 34 | Ex. 2 | 91 | 5 | 18 | 23.3 | 35.0 | 49.6 |
| Ex. 35 | Ex. 6 | 87 | 5 | 20 | 21.8 | 36.2 | 53.0 |
| Ex. 36 | Ex. 7 | 85 | 5 | 23 | 25.3 | 33.9 | 51.9 |
| Ex. 37 | Ex. 8 | 80 | 4 | 24 | 24.7 | 33.8 | 41.6 |
| Ex. 38 | Ex. 52 | 91 | 5 | 18 | 21.6 | 36.4 | 53.0 |
| Ex. 39 | Ex. 53 | 89 | 5 | 20 | 25.0 | 34.1 | 52.0 |
| Ex. 40 | Ex. 54 | 83 | 5 | 23 | 24.6 | 34.0 | 41.7 |
| Comp. Ex. 31 | Comp. Ex. 8 | 53 | 3 | 38 | 45.6 | 43.3 | 59.0 |

TABLE 10

| Ex. and Comp. Ex. | Kind of lepidocrocite particles | Resin composition | | | |
|---|---|---|---|---|---|
| | | Dispersion state | Hue a* value | Hue b* value | Hue L* value |
| Ex. 41 | Ex. 2 | 5 | 23.6 | 33.8 | 47.6 |
| Ex. 42 | Ex. 6 | 5 | 22.6 | 35.9 | 52.0 |
| Ex. 43 | Ex. 7 | 4 | 25.8 | 32.3 | 51.0 |
| Ex. 44 | Ex. 8 | 4 | 25.6 | 33.0 | 40.6 |
| Ex. 45 | Ex. 52 | 5 | 22.4 | 36.1 | 52.1 |
| Ex. 46 | Ex. 53 | 5 | 25.7 | 32.3 | 51.2 |
| Ex. 47 | Ex. 54 | 5 | 25.5 | 33.1 | 40.7 |
| Comp. Ex. 32 | Comp. Ex. 8 | 3 | 46.6 | 41.6 | 57.8 |

TABLE 11

| Ex. and Comp. Ex. | Kind of lepidocrocite particles (Ex. No.) | Surface coating treatment — Coating compound — Kind | Amount of compound added calculated as Al or SiO$_2$ (wt %) | Lepidocrocite particles subjected to surface coating treatment — Shape of γ-FeOOH particles | Amount of coated compound calculated as Al or SiO$_2$ (wt %) |
|---|---|---|---|---|---|
| Ex. 50 | Ex. 4 | Sodium aluminate | 5.00 | Rectangular parallelopipedic | 4.93 |
| Ex. 51 | Ex. 5 | Sodium aluminate 3 water glass | 1.00 / 1.00 | Rectangular parallelopipedic | 0.99 / 0.96 |
| Ex. 52 | Ex. 6 | Sodium aluminate | 1.00 | Rectangular parallelopipedic | 0.98 |
| Ex. 53 | Ex. 7 | Sodium aluminate 3 water glass | 10.00 / 1.50 | Rectangular parallelopipedic | 9.19 / 1.38 |
| Ex. 54 | Ex. 8 | Colloidal silica | 3.00 | Rectangular parallelopipedic | 2.91 |

| Ex. and Comp. Ex. | Minor axial diameter (μm) | Major axial diameter (μm) | Thickness (μm) | Aspect ratio | Geometrical standard deviation (σg) | SO$_4$ content (ppm) | Hue a* value | Hue b* value | Hue L* value |
|---|---|---|---|---|---|---|---|---|---|
| Ex. 50 | 0.051 | 0.11 | 0.014 | 2.04:1 | 1.56 | 76 | 23.8 | 34.4 | 48.6 |
| Ex. 51 | 0.073 | 0.35 | 0.035 | 4.79:1 | 1.38 | 28 | 19.8 | 38.0 | 55.2 |
| Ex. 52 | 0.073 | 0.17 | 0.041 | 2.33:1 | 1.28 | 54 | 21.5 | 37.2 | 52.6 |
| Ex. 53 | 0.045 | 0.19 | 0.027 | 4.22:1 | 1.35 | 66 | 24.4 | 36.0 | 51.1 |
| Ex. 54 | 0.060 | 0.10 | 0.020 | 1.67:1 | 1.35 | 87 | 24.6 | 34.0 | 41.6 |

TABLE 12

| Ex. and Comp. Ex. | Production of non-magnetic undercoat layer — Non-magnetic particles | Particles/resin binder (weight ratio) | Gloss 45° (%) | Surface roughness of coating film Ra (nm) | Young's modulus (relative value) of coating film (—) | Thickness of coating film (μm) |
|---|---|---|---|---|---|---|
| Ex. 56 | Ex. 3 | 5.0 | 134 | 6.0 | 115 | 3.8 |
| Ex. 57 | Ex. 4 | 5.0 | 138 | 6.8 | 126 | 3.8 |
| Ex. 58 | Ex. 5 | 5.0 | 129 | 11.2 | 136 | 3.7 |
| Ex. 59 | Ex. 2 | 5.0 | 143 | 6.8 | 118 | 3.5 |
| Ex. 60 | Ex. 6 | 5.0 | 139 | 7.6 | 138 | 3.7 |
| Ex. 61 | Ex. 7 | 5.0 | 145 | 7.2 | 140 | 3.8 |
| Ex. 62 | Ex. 8 | 5.0 | 135 | 6.4 | 121 | 3.8 |
| Ex. 63 | Ex. 50 | 5.0 | 151 | 5.8 | 121 | 3.6 |
| Ex. 64 | Ex. 51 | 5.0 | 144 | 5.8 | 135 | 3.6 |
| Ex. 65 | Ex. 52 | 5.0 | 148 | 6.0 | 136 | 3.6 |
| Ex. 66 | Ex. 53 | 5.0 | 168 | 5.4 | 120 | 3.5 |
| Ex. 67 | Ex. 54 | 5.0 | 171 | 5.6 | 123 | 3.6 |

TABLE 13

| Ex. and Comp. Ex. | Production of non-magnetic undercoat layer — Non-magnetic particles | Particles/resin binder (weight ratio) | Gloss 45° (%) | Surface roughness of coating film Ra (nm) | Young's modulus (relative value) of coating film (—) | Thickness of coating film (μm) |
|---|---|---|---|---|---|---|
| Comp. Ex. 36 | Comp. Ex. 4 | 5.0 | 43 | 116.0 | 96 | 3.1 |
| Comp. Ex. 37 | Comp. Ex. 6 | 5.0 | 65 | 30.6 | 116 | 3.6 |
| Comp. Ex. 38 | Ex. 33 | 5.0 | 112 | 17.8 | 118 | 3.8 |
| Comp. Ex. 39 | Ex. 34 | 5.0 | 28 | 48.0 | 46 | 3.5 |
| Comp. Ex. 40 | Ex. 35 | 5.0 | 78 | 28.8 | 113 | 3.9 |

TABLE 14

Properties of magnetic tape

| Ex. and Comp. Ex. | Undercoat layer used | Magnetic particles used | Particles/resin binder (weight ratio) | Coercive force Hc (Oe) | Squareness (–) |
|---|---|---|---|---|---|
| Ex. 68 | Ex. 56 | Magnetic metal particles | 5.0 | 1775 | 0.86 |
| Ex. 69 | Ex. 57 | Co-modified magnetite particles | 5.0 | 928 | 0.90 |
| Ex. 70 | Ex. 58 | Co-modified magnetite particles | 5.0 | 926 | 0.89 |
| Ex. 71 | Ex. 59 | Magnetic metal particles | 5.0 | 1783 | 0.87 |
| Ex. 72 | Ex. 60 | Co-modified magnetite particles | 5.0 | 931 | 0.89 |
| Ex. 73 | Ex. 61 | Co-modified maghemite particles | 5.0 | 876 | 0.90 |
| Ex. 74 | Ex. 62 | Co-modified maghemite particles | 5.0 | 882 | 0.90 |
| Ex. 75 | Ex. 63 | Magnetic metal particles | 5.0 | 1773 | 0.88 |
| Ex. 76 | Ex. 64 | Magnetic metal particles | 5.0 | 1783 | 0.88 |
| Ex. 77 | Ex. 65 | Magnetic metal particles | 5.0 | 1786 | 0.88 |
| Ex. 78 | Ex. 66 | Magnetic metal particles | 5.0 | 1798 | 0.89 |
| Ex. 79 | Ex. 67 | Magnetic metal particles | 5.0 | 1764 | 0.87 |

Properties of magnetic tape

| Ex. and Comp. Ex. | Gloss 45° (%) | Surface roughness of coating film Ra (nm) | Young's modulus (relative value) of coating film (–) | Thickness of coating film (μm) |
|---|---|---|---|---|
| Ex. 68 | 198 | 6.4 | 120 | 1.1 |
| Ex. 69 | 178 | 6.2 | 131 | 1.0 |
| Ex. 70 | 175 | 7.2 | 140 | 1.0 |
| Ex. 71 | 203 | 6.4 | 122 | 1.1 |
| Ex. 72 | 178 | 6.8 | 143 | 1.2 |
| Ex. 73 | 182 | 6.0 | 144 | 1.1 |
| Ex. 74 | 188 | 5.4 | 128 | 1.1 |
| Ex. 75 | 213 | 6.0 | 127 | 1.2 |
| Ex. 76 | 201 | 6.2 | 139 | 1.1 |
| Ex. 77 | 216 | 6.0 | 138 | 1.1 |
| Ex. 78 | 221 | 5.4 | 126 | 1.1 |
| Ex. 79 | 205 | 5.8 | 126 | 1.1 |

TABLE 15

Properties of magnetic tape

| Ex. and Comp. Ex. | Undercoat layer used | Magnetic particles used | Particles/resin binder (weight ratio) | Coercive force Hc (Oe) | Squareness (–) |
|---|---|---|---|---|---|
| Comp. Ex. 41 | Comp. Ex. 36 | Magnetic metal particles | 5.0 | 1737 | 0.75 |
| Comp. Ex. 42 | Comp. Ex. 37 | Magnetic metal particles | 5.0 | 1727 | 0.80 |
| Comp. Ex. 43 | Comp. Ex. 38 | Magnetic metal particles | 5.0 | 1756 | 0.83 |
| Comp. Ex. 44 | Comp. Ex. 39 | Magnetic metal particles | 5.0 | 1706 | 0.78 |
| Comp. Ex. 45 | Comp. Ex. 40 | Magnetic metal particles | 5.0 | 1721 | 0.80 |

Properties of magnetic tape

| Ex. and Comp. Ex. | Gloss 45° (%) | Surface roughness of coating film Ra (nm) | Young's modulus (relative value) of coating film (–) | Thickness of coating film (μm) |
|---|---|---|---|---|
| Comp. Ex. 41 | 114 | 58.0 | 101 | 1.1 |
| Comp. Ex. 42 | 151 | 25.5 | 122 | 1.1 |
| Comp. Ex. 43 | 170 | 16.2 | 120 | 1.1 |
| Comp. Ex. 44 | 132 | 34.8 | 96 | 1.1 |
| Comp. Ex. 45 | 168 | 22.2 | 116 | 1.1 |

What is claimed is:

1. Rectangular parallelopipedic lepidocrocite particles having a minor axial diameter of 0.045 to 0.5 μm, a major axial diameter of 0.05 to 1.0 μm, a thickness of 0.013 to 0.3 μm, a geometrical standard deviation of said major axial diameter of not more than 1.70, and an aspect ratio (major axial diameter: minor axial diameter) of 1.1:1 to 5:1.

2. Rectangular parallelopipedic lepidocrocite particles according to claim 1, which have a geometrical standard deviation of said major axial diameter of not more than 1.60.

3. Rectangular parallelopipedic lepidocrocite particles according to claim 1, which further have a geometrical standard deviation of said major axial diameter of not more than 1.40.

4. Rectangular parallelopipedic lepidocrocite particles according to claim 3, which further have an aspect ratio (major axial diameter:minor axial diameter) of 1.2:1 to 4.8:1.

5. Rectangular parallelopipedic lepidocrocite particles according to claim 4, wherein the aspect ratio (major axial diameter: minor axial diameter) is 1.2:1 to 2.33:1.

6. Rectangular parallelopipedic lepidocrocite particles according to claim 3, which further have on the surface of the lepidocrocite particles a coating layer comprising at least one selected from the group consisting of hydroxides of aluminum, oxides of aluminum, hydroxides of silicon and oxides of silicon.

7. Rectangular parallelopipedic lepidocrocite particles according to claim 6, which further have an aspect ratio (major axial diameter:minor axial diameter) of 1.2:1 to 4.8:1.

8. Rectangular parallelopipedic lepidocrocite particles according to claim 7, wherein the aspect ratio (major axial diameter: minor axial diameter) is 1.2:1 to 2.33:1.

9. Rectangular parallelopipedic lepidocrocite particles according to claim 3, which further have an $SO_4$ content of said lepidocrocite particles of not more than 1,000 ppm.

10. A process for producing rectangular parallelopipedic lepidocrocite particles as defined in claim 3, comprising the steps of:

mixing an aqueous ferrous sulfate, an aqueous alkali hydroxide and 0.1 to 5.0 mol % of at least one selected from the group consisting of a phosphorus compound and a citric compound based on Fe in a temperature range of 25 to 55° C. to produce a suspension containing an iron hydroxide and having a pH of 7 to 9; and passing an oxygen-containing gas into said suspension in the presence of seed crystals while adjusting said pH value in the range of 7 to 9 to oxide said iron hydroxide.

11. Rectangular parallelopipedic lepidocrocite particles according to claim 1, wherein the aspect ratio (major axial diameter: minor axial diameter) is 1.1:1 to 2.33:1.

12. Rectangular parallelopipedic lepidocrocite particles according to claim 1, which further have on the surface of the lepidocrocite particles a coating layer comprising at least one selected from the group consisting of hydroxides of aluminum, oxides of aluminum, hydroxides of silicon and oxides of silicon.

13. Lepidocrocite particles according to claim 12, which further have an aspect ratio (major axial diameter minor axial diameter) of 1.1:1 to 4.8:1.

14. Rectangular parallelopipedic lepidocrocite particles according to claim 13, wherein the aspect ratio (major axial diameter: minor axial diameter) is 1.1:1 to 2.33:1.

15. Rectangular parallelopipedic lepidocrocite particles according to claim 1, which further have an $SO_4$ content of said lepidocrocite particles of not more than 1,000 ppm.

16. A process for producing rectangular parallelopipedic lepidocrocite particles as defined in claim 1, comprising the steps of:

mixing an aqueous ferrous sulfate, an aqueous alkali hydroxide and 0.1 to 5.0 mol % of at least one selected from the group consisting of a phosphorus compound and a citric compound based on Fe in a temperature range of 25 to 55° C. to produce a suspension containing an iron hydroxide and having a pH of 7 to 9; and passing an oxygen-containing gas into said suspension while adjusting said pH value in the range of 7 to 9 to oxide said iron hydroxide.

17. A pigment comprising rectangular parallelopipedic lepidocrocite particles as defined in claim 1.

18. A pigment according to claim 17, wherein said pigment is an orange color pigment.

19. A pigment according to claim 17, which further have an a* value of 15.0 to 50.0, a b* value of 20.0 to 55.0 and an L* value of 20.0 to 70.0 in a hue in the 'L* a* b* color system'.

20. A paint comprising 0.1 too 200 parts by weight of a pigment as defined in claim 17 and 100 parts by weight of a paint base material.

21. A paint according to claim 20, wherein said paint is one selected from the group consisting of a solvent-based paint and a water-based paint.

22. A rubber or resin composition comprising:

0.1 to 10.0 parts by weight of a pigment as defined in claim 17 based on 100 parts by weight of said composition; and 90 to 99.9 parts by weight of a rubber and a thermoplastic resin based on 100 parts by weight of said composition.

23. A substrate for magnetic recording media comprising:

a non-magnetic substrate; and a non-magnetic undercoat layer comprising a coating composition comprising non-magnetic particles comprising rectangular parallelopipedic lepidocrocite particles as defined in claim 1, and a resin binder, which is formed on said non-magnetic base.

24. A base according to claim 23, wherein the thickness of said non-magnetic substrate is 1.0 to 300 µm, and the thickness of said non-magnetic undercoat layer is 0.2 to 10 µm.

25. A base according to claim 23, wherein the gloss of said non-magnetic undercoat layer is 120 to 200% and the surface roughness thereof is not more than 15 nm.

26. A magnetic recording medium comprising:

a non-magnetic substrate;

a non-magnetic undercoat layer comprising a coating composition comprising non-magnetic particles comprising rectangular parallelopipedic lepidocrocite particles as defined in claim 1, and a resin binder, which is formed on said non-magnetic substrate; and a magnetic recording layer formed on said non-magnetic undercoat layer.

27. A magnetic recording medium according to claim 26, wherein the gloss of said magnetic recording layer is 170 to 300% and the surface roughness thereof is not more than 12 nm.

28. Rectangular parallelopipedic lepidocrocite particles having a minor axial diameter of 0.045 to 0.5 µm, a major axial diameter of 0.05 to 1.0 µm, a thickness of 0.001 to 0.3 µm, a geometrical standard deviation of said major axial diameter of not more than 1.70, and an aspect ratio (major axial diameter: minor axial diameter) is 1.1:1 to 5:1.

29. Rectangular parallelopipedic lepidocrocite particles consisting essentially of —FeOOH, and having a minor axial diameter of 0.045 to 0.5 µm, a major axial diameter of 0.05 to 1.0 µm, a thickness of 0.001 to 0.3 µm, a geometrical standard deviation of said major axial diameter of not more than 1.70, and an aspect ratio (major axial diameter: minor axial diameter) of 1.1:1 to 5:1.

* * * * *